US010277062B2

(12) United States Patent
Govindaraj et al.

(10) Patent No.: US 10,277,062 B2
(45) Date of Patent: Apr. 30, 2019

(54) SYSTEM AND METHOD FOR DETECTING AND CHARACTERIZING AN OBJECT FOR WIRELESS CHARGING

(71) Applicant: QUALCOMM Incorporated, San Diego, CA (US)

(72) Inventors: Arvind Govindaraj, San Diego, CA (US); William Henry Von Novak, III, San Diego, CA (US); Linda Stacey Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 14/813,571

(22) Filed: Jul. 30, 2015

(65) Prior Publication Data

US 2017/0033591 A1 Feb. 2, 2017

(51) Int. Cl.
| | |
|---|---|
| *H02J 5/00* | (2016.01) |
| *H02J 7/02* | (2016.01) |
| *H02J 7/04* | (2006.01) |
| *B60L 11/18* | (2006.01) |
| *H02J 50/10* | (2016.01) |
| *H02J 50/60* | (2016.01) |

(52) U.S. Cl.
CPC ............ *H02J 7/042* (2013.01); *B60L 11/182* (2013.01); *H02J 5/005* (2013.01); *H02J 7/025* (2013.01); *H02J 50/10* (2016.02); *H02J 50/60* (2016.02); *Y02T 10/7005* (2013.01); *Y02T 10/7072* (2013.01); *Y02T 90/122* (2013.01); *Y02T 90/14* (2013.01)

(58) Field of Classification Search
CPC .. H02J 7/042; H02J 50/10; H02J 50/60; H02J 5/005; H02J 7/025; B60L 11/182
See application file for complete search history.

(56) References Cited

U.S. PATENT DOCUMENTS

| | | | | |
|---|---|---|---|---|
| 7,639,178 | B1 * | 12/2009 | Mulbrook | G01S 7/35 342/127 |
| 8,903,669 | B1 * | 12/2014 | Holly | G01S 7/024 702/75 |
| 2009/0009380 | A1 * | 1/2009 | Schnitzer | G01S 7/282 342/90 |
| 2012/0112691 | A1 | 5/2012 | Kurs et al. | |
| 2012/0155344 | A1 * | 6/2012 | Wiley | H02J 7/025 370/310 |
| 2013/0062959 | A1 * | 3/2013 | Lee | H04B 5/0031 307/104 |
| 2014/0015329 | A1 | 1/2014 | Widmer et al. | |

(Continued)

OTHER PUBLICATIONS

International Search Report and Written Opinion—PCT/US2016/041960—ISA/EPO—dated Oct. 10, 2016.

*Primary Examiner* — Drew A Dunn
*Assistant Examiner* — Sailesh Thapa
(74) *Attorney, Agent, or Firm* — Smith Tempel Blaha LLC

(57) ABSTRACT

A system for detecting and characterizing an object proximate to a wireless power transmitting unit includes a transmit circuit having a transmit antenna, the transmit circuit configured to transmit at least one signal having a frequency related to a fundamental power transmit frequency, the transmit circuit configured to measure a response of the transmit antenna, and a controller circuit configured to characterize the object based on the response of the transmit antenna.

25 Claims, 25 Drawing Sheets

(56) References Cited

U.S. PATENT DOCUMENTS

| | | |
|---|---|---|
| 2014/0091634 A1 | 4/2014 | Mayo et al. |
| 2014/0111019 A1 | 4/2014 | Roy et al. |
| 2014/0152115 A1 | 6/2014 | Wheeland et al. |
| 2014/0167704 A1 | 6/2014 | Lafontaine et al. |
| 2014/0225452 A1 | 8/2014 | Kozaki et al. |
| 2015/0028875 A1* | 1/2015 | Irie .......... G01V 3/10 324/345 |
| 2016/0190852 A1* | 6/2016 | Chiang .......... H02J 7/025 320/108 |
| 2017/0005524 A1* | 1/2017 | Akuzawa .......... H02J 50/60 |

* cited by examiner

US 10,277,062 B2

SYSTEM AND METHOD FOR DETECTING AND CHARACTERIZING AN OBJECT FOR WIRELESS CHARGING

FIELD

The present disclosure relates generally to wireless power. More specifically, the disclosure is directed to detecting and characterizing an object for wireless charging.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable. To efficiently and safely transfer power for charging rechargeable electronic devices, it is desirable to have the ability to detect and characterize an object placed on or near a wireless charger.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a system for detecting and characterizing an object proximate to a wireless power transmitting unit includes a transmit circuit having a transmit antenna, the transmit circuit configured to transmit at least one signal having a frequency related to a fundamental power transmit frequency, the transmit circuit configured to measure a response of the transmit antenna, and a controller circuit configured to characterize the object based on the response of the transmit antenna.

Another aspect of the disclosure provides a method for detecting and characterizing an object proximate to a wireless power transmitting unit including generating at least one signal having a frequency related to a fundamental power transmit frequency, transmitting the at least one signal having a frequency related to the fundamental power transmit frequency using a transmit antenna in a transmit circuit, measuring a response of the transmit antenna at the transmit circuit, and using the measured response of the transmit antenna to characterize the object.

Another aspect of the disclosure provides a device for detecting and characterizing an object proximate to a wireless power transmitting unit including means for generating at least one signal having a frequency related to a fundamental power transmit frequency, means for generating at least one signal having a frequency related to a fundamental power transmit frequency, means for transmitting the at least one signal having a frequency related to the fundamental power transmit frequency, means for measuring a response of the transmitting means, and means for characterizing the object based on the measured response of the transmitting means.

Another aspect of the disclosure provides an apparatus for detecting an object positioned in a magnetic field generated by a wireless power transmitting unit, the apparatus including a power transmit circuit comprising a transmit antenna configured to generate the magnetic field in response to being driven by a signal at a fundamental power transmit frequency, the signal having one or more signal components at a frequency related to the fundamental power transmit frequency, a measurement circuit configured to measure one or more characteristics indicative of an impedance of the transmit antenna at the frequency related to the fundamental power transmit frequency in response to the object positioned in the magnetic field, and a controller circuit configured to determine one or more characteristics indicative of a type of the object based on the one or more characteristics indicative of the impedance of the transmit antenna at the frequency related to the fundamental power transmit frequency and based on one or more expected characteristic impedance responses for different types of objects at the frequency related to the fundamental power transmit frequency.

Another aspect of the disclosure provides a computer readable medium storing computer executable code comprising instructions for generating at least one signal having a frequency related to a fundamental power transmit frequency, instructions for transmitting the at least one signal having the frequency related to the fundamental power transmit frequency using a transmit antenna in a transmit circuit, instructions for measuring a response of the transmit antenna at the transmit circuit; and instructions for using the measured response of the transmit antenna to characterize the object.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

Figure 1:
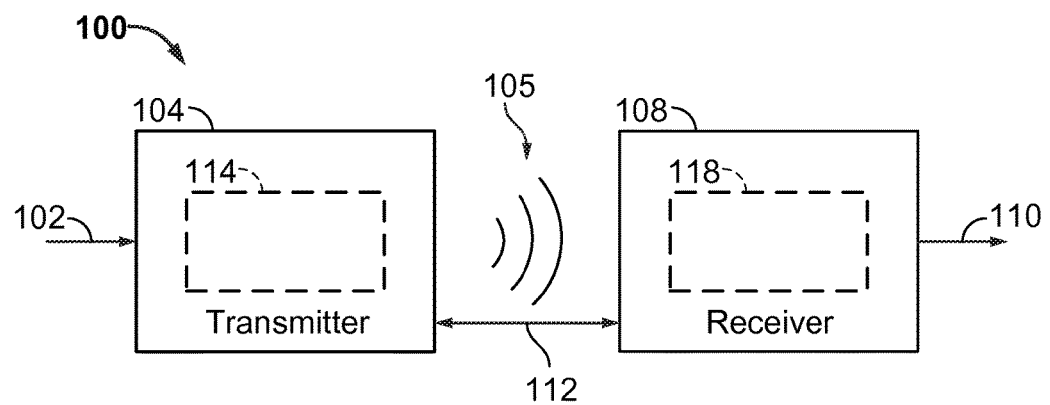
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

It is desirable to have the ability to determine the identity of and characterize an object placed in the vicinity of a wireless power transmitting unit (PTU) so that the PTU can take the appropriate action. As used herein, the term "characterize" refers not only to determining an identity of an object, but may also refer to determining a type of object (charge-receiving device (and if a charge-receiving device, what type of charge-receiving device), non-charge-receiving device, metal object, other object, etc.). The term "characterize" can also refer to more than merely detecting presence, distance or orientation of an object placed in the vicinity of a wireless power transmitting unit. A non-limiting example of "characterizing" an object can be, for example, whether the object is a metal object, a non-metal object, a compact disc (CD), a charge-receiving device that is compliant with the wireless power transmitting unit, a charge-receiving device that is not compliant with the wireless power transmitting unit, or other attributes of the object. For example, in the case of a charge-receiving object, a determination can be made whether to attempt to transfer charging power to the object based on the nature of the object. The object can be a compliant or non-compliant wireless power receiving unit (PRU), or can be a foreign object, such as, for example only, a metal object, a compact disk (CD), another electronic device, etc. Determining the identity and characteristic of an object placed in the vicinity of a power transmitting unit may include measuring AC power and impedance at the wireless power transmission frequency (i.e. 6.78 MHz in an exemplary system) looking into the PTU transmit resonator. An object placed on the wireless charging surface causes a change in the electronic response of the object. A change in the electronic response of the object can be an impedance shift, a change in power, a change in current harmonics, or a change in voltage harmonics. In other examples, uncontrolled power consumption can also be used to identify certain types of foreign objects. Measuring AC power and impedance at the wireless power transmission frequency may have certain shortcomings in detecting certain compliant objects, and it also may be more difficult to detect foreign objects in this way. Exemplary embodiments of the system and method for detecting and characterizing objects for wireless charging described herein allow for improved detection and characterization of different types of objects to be able to provide protection to the user or from damage to electronic devices caused by the wireless power transfer field, or to provide more efficient power transfer to compliant objects placed within the wireless power transfer field.

FIG. 1 is a functional block diagram of an exemplary wireless power transfer system 100, in accordance with exemplary embodiments of the invention. Input power 102 may be provided to a transmitter 104 from a power source (not shown) for generating a field 105 (e.g., magnetic or species of electromagnetic) for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are reduced. As such, wireless power transfer may be provided over larger distance in contrast to purely inductive solutions that may require large coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. The transmitter 104 may include a transmit antenna 114 (that may also be referred to herein as a coil) for outputting an energy transmission. The receiver 108 further includes a receive antenna 118 (that may also be referred to herein as a coil) for receiving or capturing energy from the energy transmission. In some cases, the field 105 may correspond to the "near-field" of the transmitter 104. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. When positioned within the field 105, a "coupling mode" may be developed between the transmit antenna 114 and the receive antenna 118. The area around the transmit and receive antennas 114 and 118 where this coupling may occur may be referred to as a coupling-mode region.

In accordance with the above therefore, in accordance with more particular embodiments, the transmitter 104 may be configured to output a time varying magnetic field 105 with a frequency corresponding to the resonant frequency of the transmit antenna 114. When the receiver is within the field 105, the time varying magnetic field 105 may induce a voltage in the receive antenna 118 that causes an electrical current to flow through the receive antenna 118. As described above, if the receive antenna 118 is configured to be resonant at the frequency of the transmit antenna 114, energy may be efficiently transferred. The AC signal induced in the receive antenna 118 may be rectified to produce a DC signal that may be provided to charge or to power a load.

Figure 2:
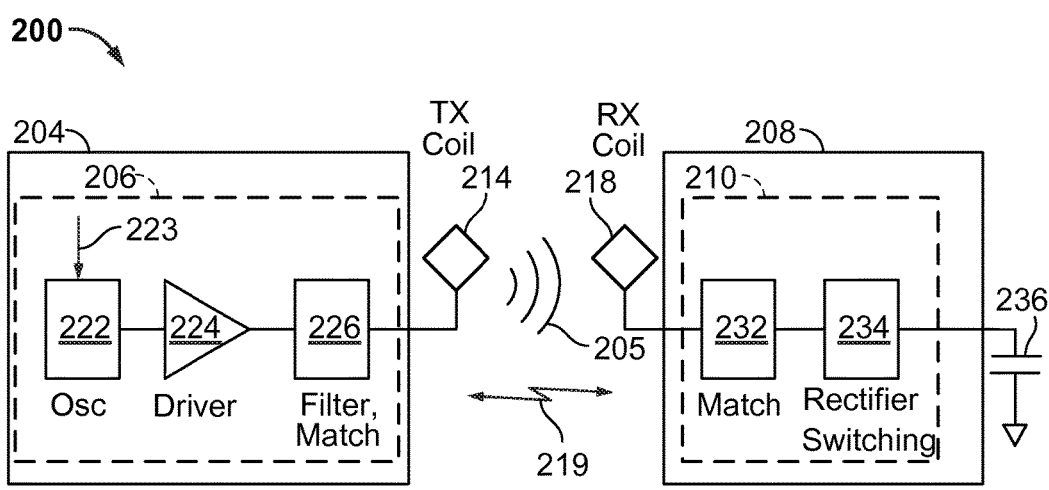
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts or 5 Watts to 40 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc.). The receiver 208 and transmitter 204 may alternatively communicate via in-band signaling using characteristics of the wireless field 205.

The receiver 208 may initially have a selectively disablable associated load (e.g., battery 236), and may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate.

Figure 3:
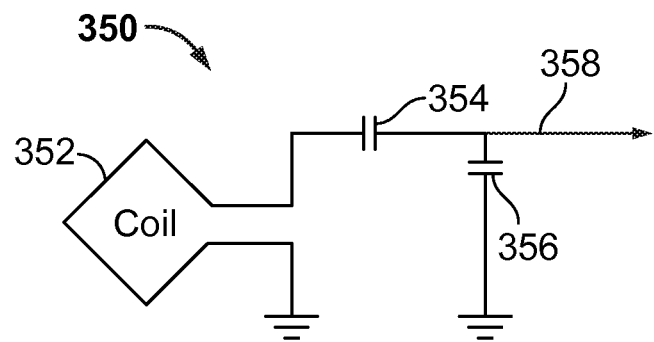
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown).

The antenna 352 may form a portion of a resonant circuit configured to resonate at a resonant frequency. When configured as a resonant circuit, the antenna 352 in some aspects of certain embodiments, may be configured as or referred to as a resonator. The resonant frequency of the loop or magnetic antenna 352 is based on the inductance and capacitance. Inductance may be simply the inductance created by the antenna 352, whereas, capacitance may be added to create a resonant structure (e.g., a capacitor may be electrically connected to the antenna 352 in series or in parallel) at a desired resonant frequency. As a non-limiting example, capacitor 354 and capacitor 356 may be added to the transmit or receive circuitry 350 to create a resonant circuit that resonates at a desired frequency of operation. For larger diameter antennas, the size of capacitance needed to sustain resonance may decrease as the diameter or inductance of the loop increases. As the diameter of the antenna increases, the efficient energy transfer area of the near-field may increase. Other resonant circuits formed using other components are also possible. As another non-limiting example, a capacitor (not shown) may be placed in parallel between the two terminals of the antenna 352. For transmit antennas, a signal 358 with a frequency that substantially corresponds to the resonant frequency of the antenna 352 may be an input to the antenna 352. For receive antennas, the signal 358 may be the output that may be rectified and used to power or charge a load.

Figure 4:
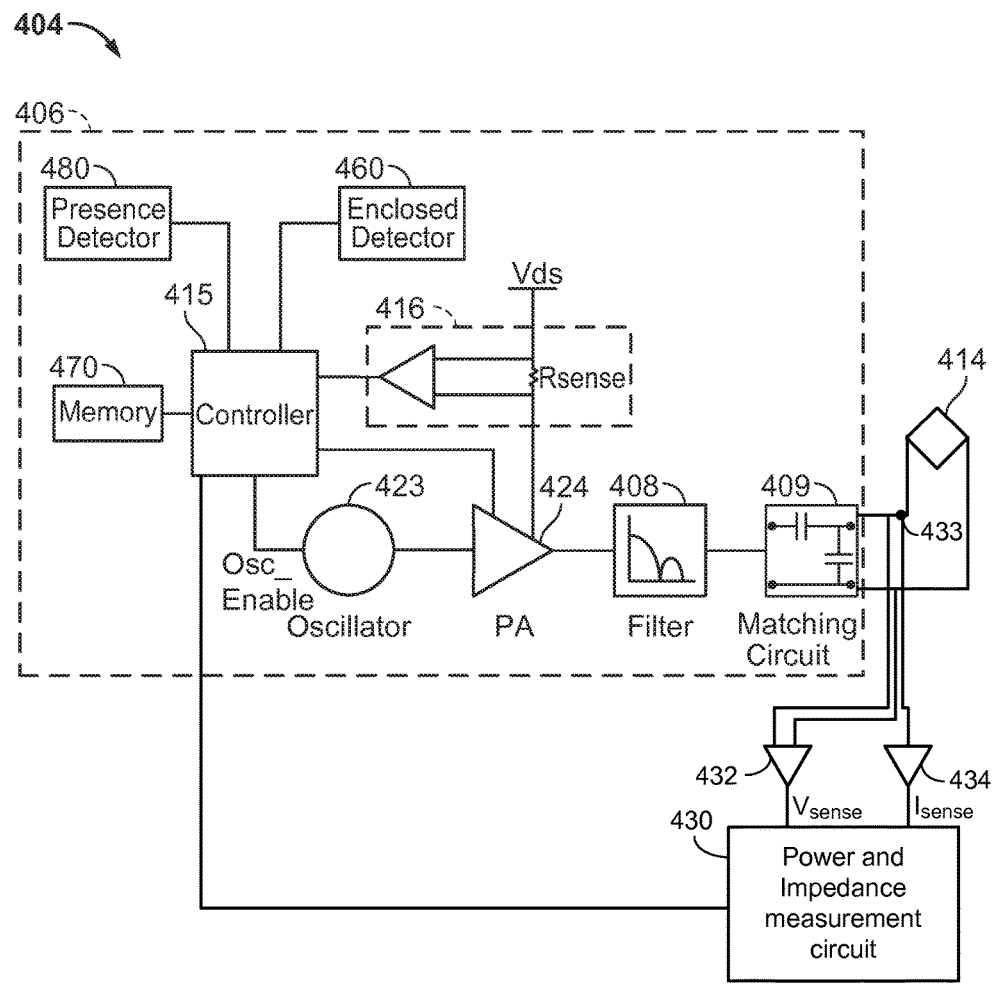
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. The transmit antenna 414 may be configured as the transmit antenna 214 as described above in reference to FIG. 2. In some implementations, the transmit antenna 414 may be a coil (e.g., an induction coil). In some implementations, the transmit antenna 414 may be associated with a larger structure, such as a pad, table, mat, lamp, or other stationary configuration. Transmit circuitry 406 may provide power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent interference with devices and self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the transmit antenna 414 or DC current drawn by the transmitter driver circuit 424. Transmit circuitry 406 further includes a driver circuit 424 configured to drive a signal as determined by an oscillator 423. The transmit circuitry 406 may be comprised of discrete devices or circuits, or alternately, may be comprised of an integrated assembly.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the transmitter driver circuit 424, that may be affected by the presence or absence of active receivers in the vicinity of the field generated by transmit antenna 414 as will be further described below. Detection of changes to the loading on the transmitter driver circuit 424 are monitored by controller 415 for use in determining whether to enable the oscillator 423 for transmitting energy and to communicate with an active receiver. As described more fully below, a current measured at the transmitter driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the transmitter driver circuit 424 in response to presence signals from the presence detector 480 and the enclosed detector 460. The transmitter 404 may receive power through a number of power sources, such as, for example, an AC-DC converter (not shown) to convert AC power present in a building, a DC-DC converter (not shown) to convert a DC power source to a voltage suitable for the transmitter 404, or directly from a DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the wireless charging field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the transmitter driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

The transmitter 404 may also include a voltage sensor 432 and a current sensor 434 operably coupled to a voltage, current, power and impedance measurement circuit 430. The voltage sensor 432 is depicted operably coupled to the matching circuit 409, while the current sensor 434 is depicted operably coupled to the transmitter 404 between the matching circuit 409 and the transmit antenna 414 at sensor agnostic point 433. The voltage, current, power and impedance measurement circuit 430 is depicted as being operably coupled to the controller 415. The voltage sensor 432 may be operably coupled at various points of the matching circuit 409 or of the transmit circuitry 406 and need not be coupled exclusively to the matching circuit 409. Similarly, the current sensor 434 may not be coupled at the point 433 indicated in FIG. 4. The voltage sensor 432 and the current sensor 434 may be operatively connected at any position where a sensed voltage and current may provide a sensed power or impedance presented to the transmit antenna 414, for example before the matching circuit 409 or the transmit antenna 414. The point current sensor agnostic 433 represents any point at which the current may be sensed by the current sensor 434. In an exemplary embodiment, the voltage sensor 432 and the current sensor 434 may be configured to sense a time-varying voltage signal and a time-varying current signal, respectively.

The voltage sensor 432 may be configured to perform the voltage sensing and may be configured to output the sensed voltage to an input of the voltage, current, power and impedance measurement circuit 430. The voltage sensor 432 may be configured to sense the difference in the voltage of the two points at which the voltage sensor 432 is connected. For example, outputs of the matching circuit 409 may comprise a voltage divider network. In some embodiments, alternative methods and systems of voltage sensing may be utilized for AC power and load impedance measurement.

Similarly, the current sensor 434 may be configured to perform the current sensing and may be configured to output the sensed current to another input of the voltage, current, power and impedance measurement circuit 430. The current sensor 434 may be configured to sense the current flowing between the points at which the current sensor 434 is connected. For example, an output of the matching circuit 409 may feed the inputs of the current sensor 434. In some embodiments, the current sensor 434 may comprise a current sensing coil (not shown in this figure) fabricated on a printed circuit board (PCB) (not shown in this figure), wherein the current may be routed to an inner PCB and a coil is built around it using the top and/or bottom planes of the PCB. In some embodiment, alternative methods and systems of current sensing may be utilized for AC power and load impedance measurement.

The voltage, current, power and impedance measurement circuit 430 may be the circuit that may be configured to perform the voltage, current, AC power and load impedance measurements that may be used in foreign object detection, load power measurement control, load detection, dynamic tuning, or other uses. In an exemplary embodiment, the voltage, current, power and impedance measurement circuit 430 may be configured to couple with at least one of the controller 415, the oscillator 423, and/or the transmitter driver 424. In an exemplary embodiment, the voltage, current, power and impedance measurement circuit 430 may provide a signal to at least one of the above listed components to adjust the output power (e.g., the current or the voltage) output by the transmitter 404. In an exemplary embodiment, the voltage, current, power and impedance measurement circuit 430 can be configured to measure one or more characteristics indicative of transmit power. For example, the voltage, current, power and impedance measurement circuit 430 can be configured to measure differential voltages via a capacitive voltage divider. In an embodiment, the voltage, current, power and impedance measurement circuit 430 can implement a resistive voltage divider. The voltage, current, power and impedance measurement circuit 430 can also measure voltage and/or current between the matching circuit 409 and the transmit antenna 414. The voltage, current, power and impedance measurement circuit 430 can measure the voltage and/or current vectorially and/or differentially. The controller 415 can receive the measured transmit power from the voltage, current, power and impedance measurement circuit 430, and can compare the measured transmit power to a received transmit power reported by a receiver such as the receiver 208 (FIG. 2).

Figure 5:
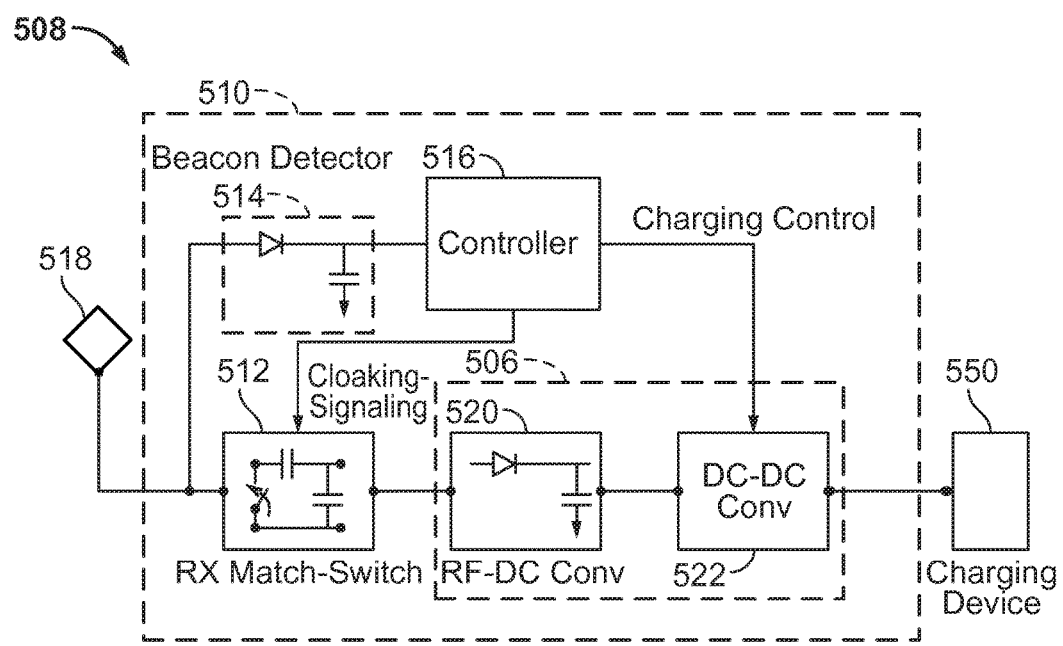
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), wearable devices, and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage. The DC-to-DC converter 522 (or other power regulator) converts the rectified RF energy signal into an energy potential (e.g., voltage) that is compatible with device 550 with an output voltage and output current. Various RF-to-DC converters are contemplated, including partial and full rectifiers, regulators, bridges, doublers, as well as linear and switching converters.

Receive circuitry 510 may further include RX matching and switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

When multiple receivers 508 are present in a transmitter's near-field, it may be desirable to adjust the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 may take place either via an "out-of-band" separate communication channel/antenna or via "in-band" communication that may occur via modulation of the field used for power transfer.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes controller 516 for coordinating the processes of receiver 508 described herein including the control of RX matching and switching circuitry 512 described herein. It is noted that the controller 516 may also be referred to herein as a processor. Cloaking of receiver 508 may also occur upon the occurrence of other events including detection of an external wired charging source (e.g., wall/USB power) providing charging power to device 550. Controller 516, in addition to controlling the cloaking of the receiver, may also monitor beacon circuitry 514 to determine a beacon state and extract messages sent from the transmitter 404. Controller 516 may also adjust the DC-to-DC converter 522 for improved performance.

In an exemplary embodiment, harmonics are generated in the receive circuitry 510 as a function of the operation of non-linear devices and switching circuits, which may be part of the RF-to-DC converter 520 the DC-to-DC converter 522, or other elements in the receive circuitry 510. In an exemplary embodiment, harmonics generated by these non-linear devices can be detected at the receive antenna 518 as voltage and current harmonic components. These harmonics can also be received and detected at the transmit antenna 414 (FIG. 4) as voltage and/or current harmonic components or as power and/or impedance harmonic components. The magnitude of the harmonics are dependent on the operating condition of the receiver 508 (e.g., load, power, etc.). These harmonics are also a function of the circuit topologies utilized in the receiver 508 and can be used to uniquely identify to the transmitter 404 the type of receiver implementation. In an exemplary embodiment, it is possible to distinguish a compliant wireless power receiving unit from a non-compliant wireless power receiving unit by performing a test of the harmonics at low power and at high power. A compliant wireless power receiving unit is one that is designed to receive power from the transmitter 404, while a non-compliant wireless power receiving unit is either not capable of receiving power from the transmitter 404 or not designed in a way to be able to be able to function within the wireless power system as intended. Linear devices (metal objects) will experience the same harmonic ratios, while non-linear devices (i.e. devices with rectifiers) will exhibit disproportionately higher harmonics at higher power levels.

Figure 6:
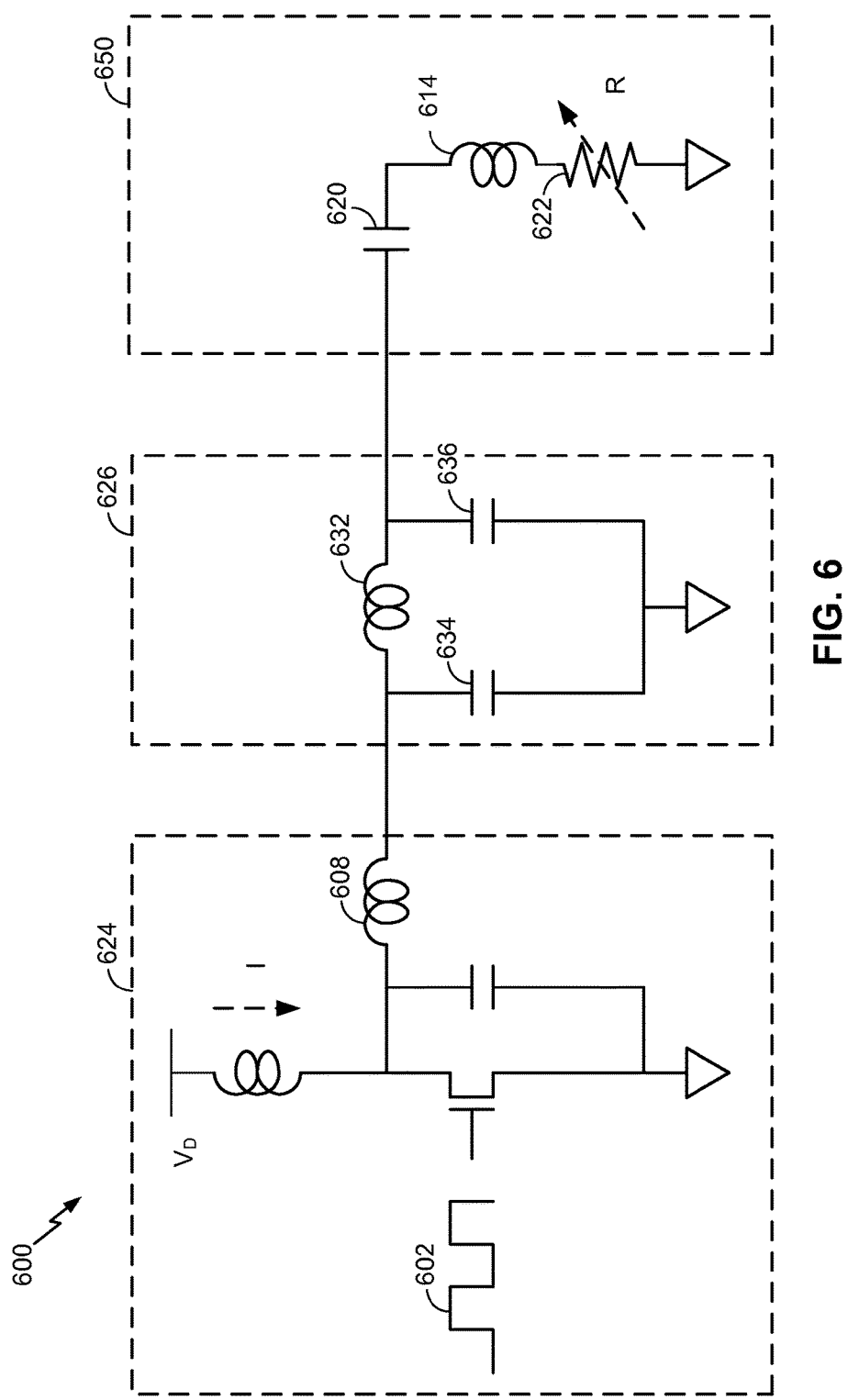
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In various embodiments, the wireless power transmission system 100, described above with respect to FIGS. 1-6, can vary a wireless power transmission based on detection and characterization of a nearby object. The nearby object can include an intended receiver, a device to be charged, and/or a foreign object. A foreign object can be something other than an intended transmission target (i.e., a non-charging device) such as, for example, a parasitic receiver, an inorganic object, a metal object (e.g., coin, foil etc.), or a living object (such as a human, animal, etc.). A parasitic receiver can include, for example, a non-electronic metallic object, an unauthorized chargeable device, etc.

For example, as discussed above with respect to FIG. 4, the transmitter 404 can include the presence detector 480, which can detect the presence, distance, orientation, and/or location of the nearby object. In various other embodiments, the presence detector 480 can be located in another location such as, for example, on the receiver 508, or elsewhere. The controller 415 can reduce transmission power when a foreign object is detected within a first distance. In various embodiments, the wireless power transmission system 100 can adjust a characteristic of the wireless power transmission in accordance with rules or regulations regarding biological safety, fire safety, etc. For example, the wireless power transmission system 100 can adjust the transmit power such that the electromagnetic field reaching a nearby human body is below a threshold, given the distance to the human body.

In various embodiments, the presence detector 480 can detect the presence of a nearby object based on a line-of-sight detection mechanism. Line-of-sight detection mechanisms can include for example, infrared detection, ultrasonic detection, laser detection, etc. In embodiments including embedded transmitters, where power can be transmitted through an opaque surface such as a table or desk, it can be preferable to use a non-line-of-sight detection mechanism. Non-line-of-sight mechanisms can include, for example, capacitive detection, radiometric detection, etc. In various embodiments which will be described herein, the presence detector 480 can use a harmonic detection system to detect the presence, type, distance, orientation, and/or location of a nearby object, based on changes in received signal strength at harmonics of the fundamental system frequency.

Figure 7:
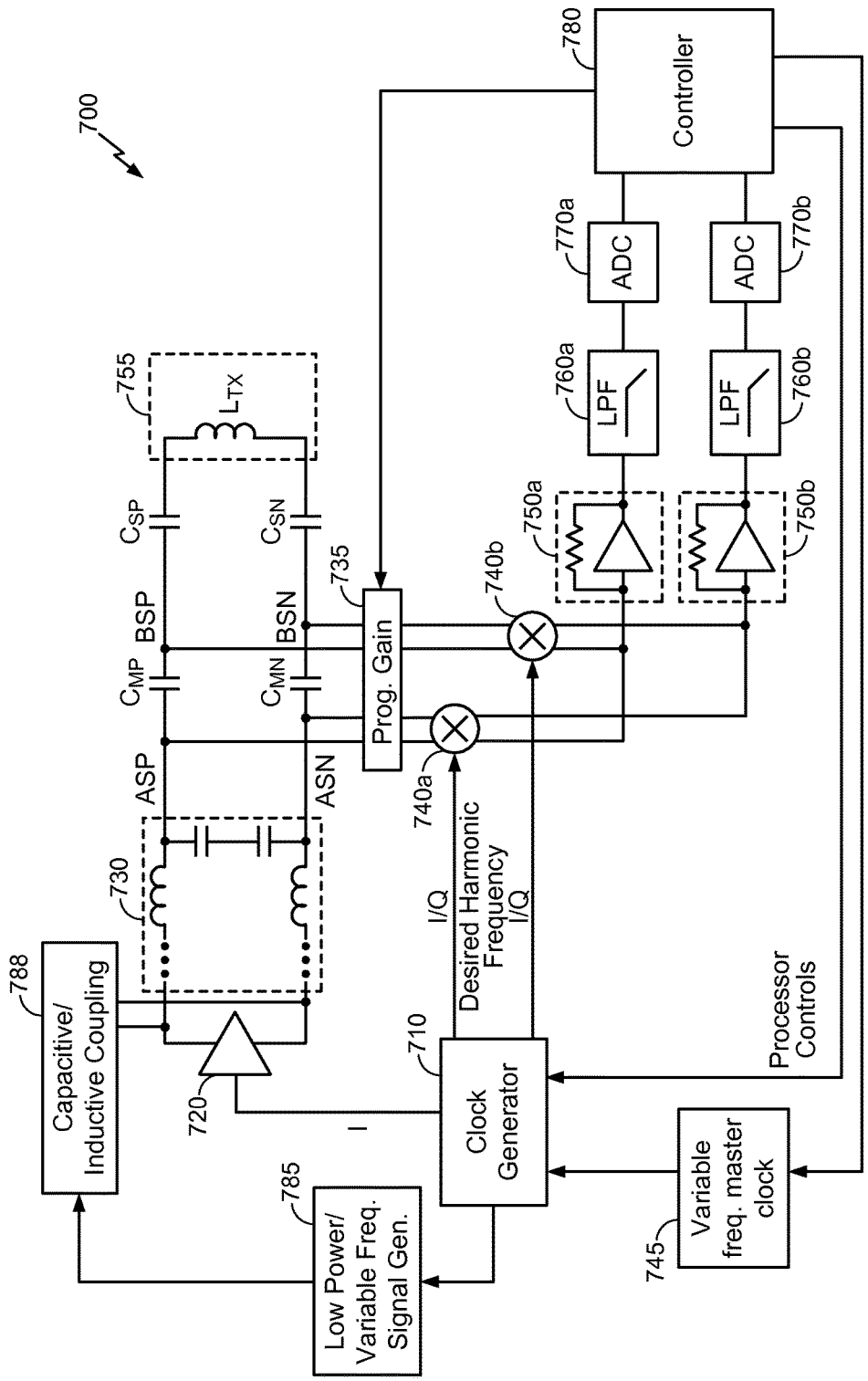
FIG. 7 is a functional block diagram of a portion of transmit circuitry that can be used in the wireless power transfer system of FIG. 1, in accordance with exemplary embodiments of the invention.

FIG. 7 is a functional block diagram of a portion of transmit circuitry 700 that can be used in the wireless power transfer system 100 of FIG. 1, in accordance with exemplary embodiments. In various embodiments, the elements presented FIG. 7 can comprise portions of the transmitter 404 of FIG. 4. In various embodiments, the elements presented FIG. 7 can be configured in balanced or single ended form; FIG. 7 and further discussion presents this example in balanced form. The transmit circuitry 700 can include a clock generator 710, a transmit amplifier 720, a transmit filter and/or matching circuit 730, positive and negative measurement capacitors $C_{MP}$ and $C_{MN}$, positive and negative series capacitors $C_{SP}$ and $C_{SN}$, a transmit antenna (transmit coil or transmit resonator) $L_{TX}$, 755, a programmable gain element 735, differential mixers 740a and 740b, summing amplifiers 750a and 750b, low-pass filters (LPFs) 760a and 760b, analog-to-digital converters (ADCs) 770a and 770b, a controller 780 and a variable frequency master clock 745. It is noted that the controller 780 may also be referred to herein as a processor.

The transmit circuitry 700 also comprises a low power/variable frequency signal generator 785 and a capacitive/inductive coupling 788. In an exemplary embodiment, the low power/variable frequency signal generator 785 can be configured to generate signals at harmonic frequencies of the fundamental power transmit frequency or at frequencies other than harmonic multiples of the fundamental power transmit frequency. The capacitive/inductive coupling 788 couples the output of the low power/variable frequency signal generator 785 to the transmit antenna 755 at the output of the transmit amplifier 720.

In various embodiments, the transmit circuitry 700 can be configured to determine a transmit characteristic, or response at the transmit antenna 755 such as any one or more of a voltage, a current, a transmit power and a resonator impedance. For example, the transmit circuitry 700 can be configured to measure the voltage (e.g., RMS) and/or current applied to the transmit antenna 755. The transmit circuitry 700 can be configured to take vector measurements. For example, the transmit circuitry 700 can measure either or both of a magnitude and a phase of the current and/or voltage applied to the transmit antenna 755. In an embodiment, the transmit circuitry 700 can implement or include the power and impedance measurement circuit 430 (FIG. 4).

The clock generator 710 may be configured to provide in-phase (I) and quadrature (Q) clock signals (either positive or negative) to the transmit amplifier 720 and the mixers 740a and 740b. However, in other exemplary embodiments, the clock generator 710 may be configured to provide clock signals other than in-phase and quadrature clock signals. In the illustrated embodiment, the clock generator 710 is configured to generate the I/Q signals based on an oscillator input and control by the controller 780. In an exemplary embodiment, the controller 780 can control the variable frequency master clock 745 to generate various desired frequencies. In an exemplary embodiment, the transmit circuitry 700 is configured to measure one or more of voltage, current, impedance and power at the fundamental power transfer frequency (e.g. 6.78 MHz), and is also configured to measure one or more of voltage, current, impedance and power at harmonic frequencies of the fundamental power transfer frequency. In another exemplary embodiment, the transmit circuitry 700 is configured to measure one or more of voltage, current, impedance and power at the fundamental power transfer frequency (e.g. 6.78 MHz), and is also configured to measure one or more of voltage, current, impedance and power at frequencies other than at harmonic multiples of the fundamental power transfer frequency. The I and Q frequencies and the power transfer frequency provided to the transmit amplifier 720 may be different. The variable frequency master clock 745 can be configured to provide the desired clock frequency to the clock generator 710, which, in an exemplary embodiment, then provides the transmit signal to the transmit amplifier 720. In an exemplary embodiment, the clock generator 710 is configured to generate in-phase and quadrature components of the incoming clock signal from the variable frequency master clock 745. In an embodiment, the variable frequency master clock 745 may be configured to provide an input that can be four times the transmit frequency. For example, in various embodiments having transmit frequencies of about 468.75 KHz, 6.78 MHz, and 13.56 MHz, the oscillator input can be about 1.87 MHZ, 27.12 MHz, and 54.24 MHz, respectively. In an embodiment, the oscillator input can be received from the oscillator 423 (FIG. 4).

In an exemplary embodiment, the clock generator 710 can be configured to generate four clock signals I, Q, I', and Q' (generically referred to as "I/Q") at a quarter of the oscillator input frequency (e.g., 6.78 MHz). Each of the clocks I, Q, I', and Q' can represent a different phase (e.g., 0, 90, 180, and 270 degrees). Accordingly, I can be advanced 90 degrees ahead of Q. I' and Q' can be inverted versions of their respective outputs I and Q, and can provide 180 phase shifts of the main signals I and Q. A person having ordinary skill in the art will appreciate that other phase steps can be used (e.g., 45 degrees, 60 degrees, etc.).

The clock generator 710 can selectively provide both sine and cosine signals to the mixers 740a and 740b. In various embodiments, the sine and cosine signals can include sinusoidal signals (for example, in embodiments including analog multipliers) and square waves (for example, in embodiments including digital multiplexers). For example, the clock generator 710 can selectively provide one or more of the clock signals I, Q, I', and Q' to the mixers 740a and 740b via one or more multiplexers. For example, the clock generator 710 can include one multiplexer per mixer 740a and 740b. In an embodiment, the selected clock signals I/Q can be re-clocked, for example, via a D flip flop. Re-clocking the signals I/Q can reduce delay variations between phases. Selection of the clock signals I/Q provided to the mixers 740a and 740b can be controlled by, for example, the controller 780. The clock generator 710 is configured to provide the desired (I/Q) signals to the mixers 740a and 740b, corresponding to the desired harmonic frequency. The frequency of the signal provided to the transmit amplifier 720 is constant at the desired power transfer frequency—e.g., 6.78 MHz.

The transmit amplifier 720 is configured to drive a time varying signal to the transmit coil $L_{TX}$. The transmit amplifier 720 can drive the time varying signal based on the clock signal received from the clock generator 710. The transmit amplifier 720 receives the I clock phase from the clock generator 710. In an embodiment, the transmit amplifier 720 can receive a separate clock signal, for example, from the oscillator 423 (FIG. 4). In an embodiment, the transmit amplifier 720 can be the transmitter driver circuit 424 (FIG. 4).

The transmit filter 730 serves to provide impedance matching and/or reduction of harmonic emissions at the transmit antenna 755. Other exemplary embodiments can include different filter topologies, including but not limited to, notch filters that attenuate specific frequencies while passing others and can include an adaptive impedance match, that can be varied based on measurable transmit metrics, such as output power to the coil $L_{TX}$. In various embodiments, the transmit filter 730 can implement or include the filter 408 (FIG. 4) and/or the matching circuit 409 (FIG. 4).

The differential mixers 740a and 740b serve to measure voltages at the measurement capacitors $C_{MP}$ and $C_{MN}$. Particularly, the differential mixers 740a and 740b are configured to synchronously mix the I/Q clocks, received from the clock generator 710, with the signal to be measured using multiplying phase detectors. The measurement capacitors $C_{MP}$ and $C_{MN}$ serve as a known impedance, where the voltage across the measurement capacitors $C_{MP}$ and $C_{MN}$ is proportional to current. Additional devices can be added to scale voltage levels at the inputs of the mixers 740a and 740b. The differential mixers 740a and 740b facilitate voltage measurements on both sides of the measurement capacitors $C_{MP}$ and $C_{MN}$ (i.e., at nodes ASP, BSP, ASN, and BSN). Accordingly, the current though the measurement capacitors $C_{MP}$ and $C_{MN}$ can be calculated and used to determine the power transmitted at the transmit antenna 755.

The summing amplifiers 750a and 750b serve to provide a virtual AC ground to the multiplexers, converting DC current to voltages which reflect the real and/or imaginary portions of $V_A+V_B$ or $V_A-V_B$, where $V_A$ represents the voltage across the nodes ASP and ASN, and $V_B$ represents the voltage across the nodes BSP and BSN. The clock generator 710 can select the particular summation performed by selecting and providing the appropriate clock phases to the mixers 740a and 740b. In some implementations, the clock generator 710 can select and provide the appropriate clock phases to the mixers 740a and 740b to individually measure $V_A$ and $V_B$.

For example, two signals driving each mixer 740a and 740b can be represented by sine waves: Am sin M for the differential signals measured across the node pairs ASP/ASN and BSP/BSN, and sin R or cos R for the reference signal received from the clock generator 710 (based on the in-phase and quadrature-phase signals, respectively). The mixers 740a and 740b can multiply sin M and either sin R or cos R as shown in Equations 1 and 2, where ω is 2π times the transmit frequency, and "α" is a phase offset.

$$\sin M \sin R = \tfrac{1}{2}[\cos(\omega t+\alpha-\omega t)-\cos(\omega t+\alpha+\omega t)] \quad (1)$$

$$\sin M \cos R = \tfrac{1}{2}[\sin(2\omega t+\alpha)+\sin \alpha] \quad (2)$$

The LPFs 760a and 760b filter non baseband spectral content such as the 2ω term. For example, the products sin M sin R and sin M cos R can be filtered as shown in Equations 3 and 4.

$$\text{Filtered}(\sin M \sin R) = \tfrac{1}{2} \cos \alpha \qquad (3)$$

$$\text{Filtered}(\sin M \cos R) = \tfrac{1}{2} \sin \alpha \qquad (4)$$

Accordingly, the angle α can be determined by an arctangent of the two measured signals, as shown in Equation 5.

$$\alpha = \arctan[\tfrac{1}{2} \sin \alpha / \tfrac{1}{2} \cos \alpha] \qquad (5)$$

The outputs of the mixers 740a and 740b are combined at the summing amplifiers 750a and 750b, and low-pass filtered at the LPFs 760a and 760b to remove signal harmonics and provide a DC value which represents the phase offset of the signal, and a scaled portion of the magnitude. The ADCs 770a and 770b provide digital values to the controller 780. The digital values provided by the ADCs 770a and 770b include information about the magnitude and phase of the signals being measured (i.e., voltage and current). The controller 780 can process this data to extract the desired magnitude and phase information. The mixers 740a and 740b, the summing amplifiers 750a and 750b, the low-pass filters 760a and 760b and the ADCs 770a and 770b have a frequency dependent response. The programmable gain element 735 compensates for this frequency dependent response by linearizing the response across frequency so that the controller 780 can accurately measure the magnitude and phase of the voltage and current to detect harmonic components thereof. The magnitude of the voltage and current for higher harmonics might be lower than the magnitude of the voltage and current at the fundamental frequency, thus allowing the controller 780 to detect the harmonics and use the detected harmonics to characterize an object. The programmable gain element 735 can be controlled by the controller 780 and can be configured to adjust the gain based on the harmonic frequency being measured. For example, a gain of 10× at the $3^{rd}$ harmonic, a gain of 20× at the $5^{th}$ harmonic, etc.

The controller 780 is configured to adjust the clock generator 710 to source both sine and cosine signals to the mixers 740a and 740b, and to thereby obtain voltage vectors before and after the measurement capacitors $C_{MP}$ and $C_{MN}$. The controller 780 can calculate the current through the measurement capacitors $C_{MP}$ and $C_{MN}$ by dividing the voltage difference (i.e., $V_A - V_B$) by the value of the measurement capacitors $C_{MP}$ and $C_{MN}$. In various embodiments, the controller 780 can scale the measurements by one or more scaling factors and/or convert the voltage measurement to a root-mean-square (RMS) voltage. The controller 780 can further multiply the resulting complex vectors to determine real and reactive power. In addition, impedance can also be calculated using the voltage and current vectors.

In an exemplary embodiment, the non-linear operation of the transmit amplifier 720 leads to harmonic components of the power transmission frequency being present in the current and voltage at the transmit antenna 755. This current and voltage can be measured at the harmonic frequencies by the transmit circuitry 700 described herein, and, in an alternative exemplary embodiment, by the circuitry of FIG. 9 to be described below. In an exemplary embodiment of measuring the harmonic components, the variable frequency master clock 745 can be configured to cause the clock generator 710 to select the desired harmonic frequency based on a control signal provided by the controller 780. In an exemplary embodiment, the controller 780 determines the harmonic frequency, or other frequency at which voltage and current vectors can be measured and can adjust the variable frequency master clock 745 to generate the desired frequency. In an alternative exemplary embodiment described below in FIG. 9, a programmable band pass filter can be configured to select the desired harmonic frequency.

In an exemplary embodiment, the low power/variable frequency signal generator 785 and the capacitive/inductive coupling 788 can be configured to generate signals at harmonic frequencies of the fundamental power transmit frequency and at frequencies other than multiples of the fundamental power transmit frequency, that is, at frequencies other than harmonic frequencies of the fundamental power transmit frequency. In an exemplary embodiment, the low power/variable frequency signal generator 785 generates a definable signal, which is coupled to the output of the transmit amplifier 720 and to the transmit antenna 755 by the capacitive/inductive coupling 788. While showing only an inductor, $L_{TX}$, the transmit antenna 755 may include one or more capacitive elements for resonant operation in some embodiments. In an exemplary embodiment, the transmit circuitry 700 can use frequencies other than the harmonic frequencies of the fundamental power transfer frequency such that the voltage and current vector measurements can be made at any frequency.

In the embodiment of FIG. 7, the transmit circuitry 700 is configured to take measurements at various frequencies, which can be at harmonic frequencies of the fundamental power transmit frequency, or at frequencies other than at harmonic frequencies of the fundamental power transmit frequency. In an embodiment, the configuration shown in FIG. 7 can allow balanced demodulation. However, one of ordinary skill in the art will understand that the techniques described herein can be implemented in a single-ended configuration. For example, a single measurement capacitor $C_M$ can be used.

In the embodiment of FIG. 7, the transmit circuitry 700 is configured to use measurement capacitors $C_{MP}$ and $C_{MN}$ as series impedances. However, one of ordinary skill in the art will understand that the techniques described herein can be applied to any impedance element, generally referred to herein as a series element $Z_M$. For example, measurement can be performed using one or more inductors in the transmit filter 730, one or more of the measurement capacitors $C_{MP}$ and $C_{MN}$ can be replaced with inductors or resistors, an active or passive reactive network, a current transformer, etc.

Similarly, one of ordinary skill in the art will understand that the techniques described herein can be applied to any series impedance element within the current path by repositioning $Z_M$. For example, measurement can be performed using one or more inductors in the transmit filter 730, one or more of the measurement capacitors $C_{SP}$ and $C_{SN}$ can be replaced with inductors or resistors, an active or passive reactive network, etc. In some embodiments, the transmit circuitry 700 can include a parallel capacitor $C_P$, in parallel with the transmit antenna $L_{TX}$ 755.

Figure 8:
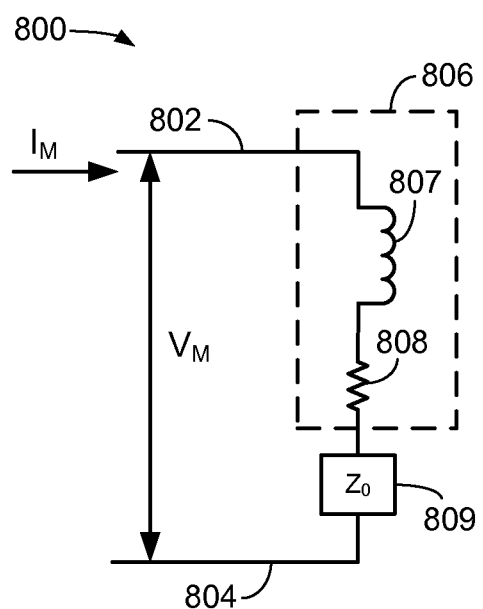
FIG. 8 is a schematic diagram illustrating an exemplary embodiment of a transmit antenna of FIG. 7.

FIG. 8 is a schematic diagram illustrating an exemplary embodiment of a transmit antenna of FIG. 7. The circuit 800 comprises conductors 802 and 804 coupled to an antenna 806. The antenna 806 may also be referred to as a coil, and may include capacitive elements (not shown) to form a resonant structure. The antenna 806 is coupled in series to an impedance ($Z_O$) 809. In an exemplary embodiment, the antenna 806 comprises an inductance 807 coupled in series to a resistance 808. In an exemplary embodiment, the antenna 806 can be an embodiment of the transmit antenna $L_{TX}$ 755 of FIG. 7 or the transmit antenna 414 of FIG. 4. A current $I_M$ flows in the antenna 806 and a voltage $V_M$ exists across the conductors 802 and 804. In an exemplary embodiment, the voltage $V_M$ and the current $I_M$ are measured and the impedance $Z_0$ (and/or power) of the antenna 806 can be analyzed to determine the response of the antenna 806 as a result of the electrical or electronic characteristics of an object placed in proximity of the antenna 806.

In an exemplary embodiment, magnitude and phase of the voltage ($V_M$) and current ($I_M$) can be measured "looking into" the antenna 806. The magnitude and phase of the voltage ($V_M$) and current ($I_M$) can be measured using embodiments of the circuits shown in FIG. 7 and FIG. 9 below. These measurements can be made at frequencies that are multiples of the fundamental power transfer frequency (i.e. 6.78 MHz, 13.56 MHz, 20.34 MHz etc., in an exemplary wireless power transfer system) and can be used to characterize an object placed in proximity to the antenna 806. Alternatively, these measurements can be made at frequencies other than multiples, that is, other than at harmonic frequencies, of the fundamental power transfer frequency and can be used to characterize an object placed in proximity to the antenna 806. The power and impedance of the antenna 806 can also be measured to characterize an object placed in proximity to the antenna 806.

In an exemplary embodiment, the change in the impedance $Z_0$ 809 as a result of the placement of an object in the vicinity of the antenna 806 (e.g., when an object is placed on a wireless charging surface or within the field generated by the antenna 806) can be modeled as a reflected impedance in series with the antenna 806. This reflected impedance is proportional to the square of the frequency of magnetic fields and hence the magnitude of the reflected impedance is greater at higher frequencies. In addition, in the case of a tuned resonant receiver, the reflected impedance is lower at higher frequencies because it is not a tuned circuit at those frequencies. Further the impedance vs. frequency characteristics of an object can serve to uniquely identify various types of objects.

In an exemplary embodiment, the change in the impedance $Z_0$ as a result of the placement of an object in the vicinity of the antenna 806 (i.e., when an object is placed on a wireless charge surface) can result in what is referred to as "detuning" of the antenna 806. For example, a large metallic object can cause a shift in the resonant frequency of the antenna 806 (e.g. shift from 40 MHz-45 MHz). This will cause a change in the relative strength of the harmonics (voltage/current) measured at the antenna 806 and can be used to characterize the object.

Figure 9:
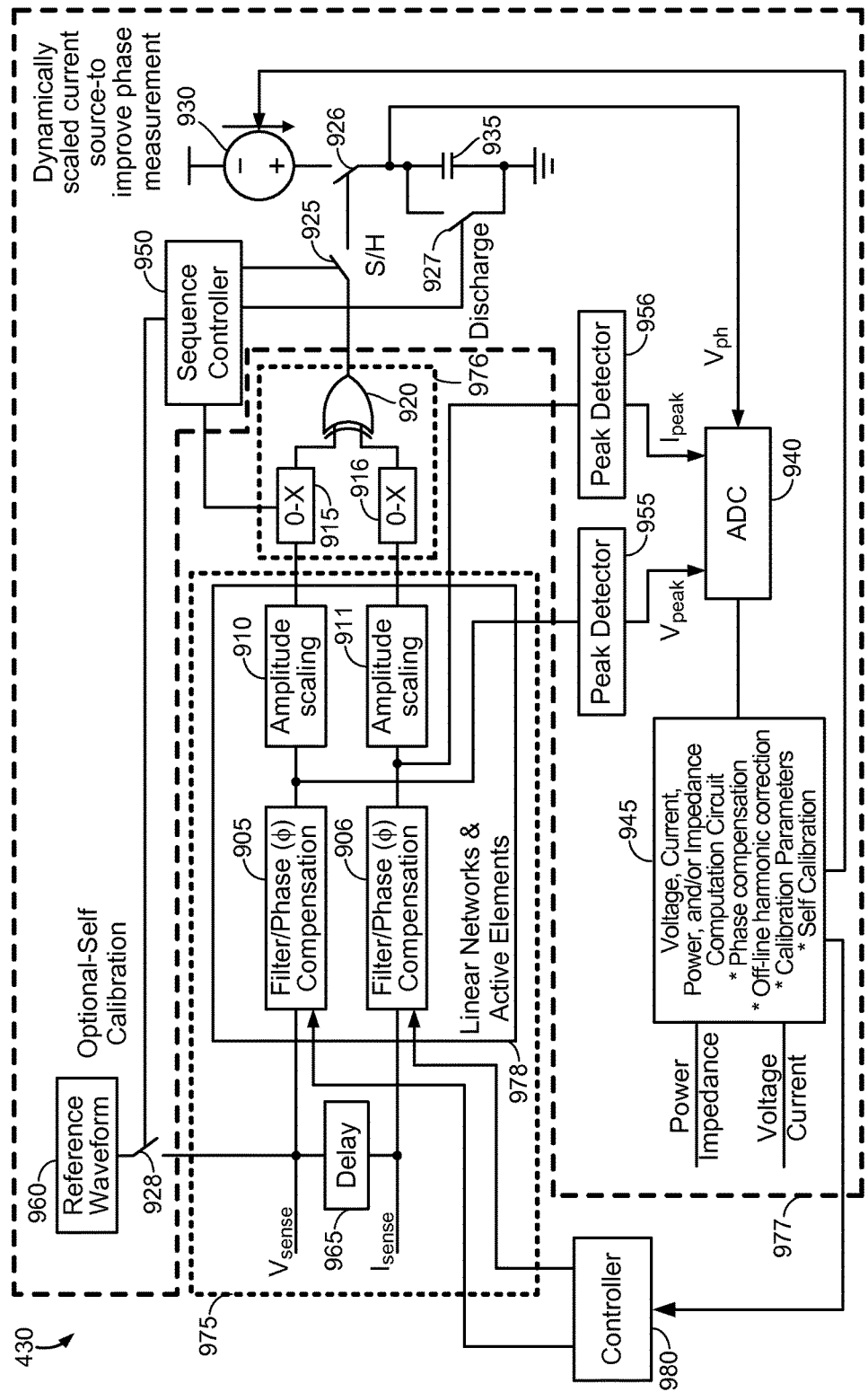
FIG. 9 is a schematic diagram illustrating an exemplary voltage, current, power and impedance measurement circuit implemented in the transmitter of FIG. 4.

FIG. 9 is a schematic diagram illustrating an exemplary voltage, current, power and impedance measurement circuit implemented in the transmitter 404 of FIG. 4. The voltage, current, power and impedance measurement circuit 430 is an alternative implementation of the circuit shown in FIG. 7, and can be used to obtain voltage, current, power and impedance measurements looking into the antenna 806 (FIG. 8) that can be used to characterize an object placed on a wireless charging surface. As described above, the voltage, current, power and impedance measurements can be used to detect the change in the harmonics at the antenna 806 impedance $Z_0$ 809 as a result of the placement of an object in the vicinity of the antenna 806 (i.e., when an object is placed on a wireless charging surface). For example, a change in the impedance $Z_0$ 809 as a result of the placement of an object in the vicinity of the antenna 806 (i.e., when an object is placed on a wireless charging surface) can be measured and used to characterize the object.

As noted above, the voltage, current, power and impedance measurement circuit 430 of FIG. 4 may comprise multiple components and modules that may be used in determining the power and impedance of an AC device. According to the implementation shown in FIG. 9, the voltage, current, power and impedance measurement circuit 430 may be divided into three portions, including an analog-front-end ("AFE") 975, a zero-crossing and phase detection circuit 976, and a voltage, current, power and impedance measurement system 977. Each of these circuits and systems may be configured to interact with and manipulate analog voltage and current signals input into and through the AFE 975. As represented in FIG. 4, the voltage, current, power and impedance measurement circuit 430 may be part of a transmit circuit 406 comprising an antenna 414, the transmit circuit 406 configured to generate a wireless field via the antenna 414 for transferring charging power to a receiver device, the transmit circuit 406 having a time-varying voltage and a time-varying current.

The AFE 975 may comprise a voltage sensor 432 and a current sensor 434 (not shown in this figure) and the linear networks and active elements 978 (comprising a pair of filter/phase compensation circuits, including a voltage filter/phase compensation circuit 905 and a current filter/phase compensation circuit 906) and a pair of amplitude scaling circuits (a voltage amplitude scaling circuit 910 and a current amplitude scaling circuit 911). In an exemplary embodiment, the voltage filter/phase compensation circuit 905 and a current filter/phase compensation circuit 906 can be implemented using programmable band pass filters, the frequencies of which can be selected by a controller 980. In an exemplary embodiment, the controller 980 can be configured to control the band pass characteristics of the voltage filter/phase compensation circuit 905 and the current filter/phase compensation circuit 906 to select a desired frequency for voltage and current measurement. It is noted that the controller 980 may also be referred to herein as a processor. The frequency selected by the controller 980 can be a harmonic frequency of a fundamental power transfer frequency, or can be a frequency other than a harmonic of the fundamental power transfer frequency. In an exemplary embodiment, the functionality of the controller 980 can be incorporated into the controller 415 (FIG. 4).

The zero-crossing and phase detection circuit 976 may comprise a voltage zero-crossing detector 915 and a current zero-crossing detector 916 and an XOR gate 920. The voltage, current, power and impedance measurement system 977 may comprise a sequence controller 950, a plurality of switches 925, 926, and 927, a dynamically scaled (i.e., variable) current source 930, a capacitor 935, a voltage peak detector 955 and a current peak detector 956, an analog/digital (A/D) converter 940, and a voltage, current, power and impedance computation circuit 945 (or other structure) that may perform a process.

As discussed in reference with FIG. 4, the voltage, current, power and impedance measurement circuit 430 may be coupled to the voltage sensor 432 and the current sensor 434. As shown in FIG. 9, the outputs of the voltage sensor 432 and the current sensor 434 are the sensed voltage $V_{sense}$ and the sensed current $I_{sense}$. As discussed above, alternative methods and systems for sensing the voltage and the current may be utilized by the voltage, current, power and impedance measurement circuit (or module) 430. Both of the sensed voltage and the sensed current may be coupled to the respective filter/phase compensation circuits 905 and 906 and the amplitude scaling circuits 910 and 911. The filter/phase compensation circuits 905 and 906 and the amplitude scaling circuits 910 and 911 may comprise linear networks and active components of the power and impedance circuit 430. The AFE 975 may need not to be limited to linear networks or active elements 978, and may comprise additional components to perform the compensation and scaling described below. Similarly, the sensed current input $I_{sense}$ may be coupled to the current filter/phase compensation circuit 905, an output of which may be coupled to the current amplitude scaling circuit 911.

The conditioning and corrections provided by the AFE 975 and the associated components may improve the accuracy and the precision of the subsequent power measurement system. As will be discussed below, the components of the AFE 975 may be calibrated so that their functions and accuracy may be verified and corrected as desired.

The AFE 975 is a system that may provide compensated and scaled sensed voltage and current signals to the zero-crossing and phase detection circuit 976. The voltage sensor 432 and current sensor 434 (shown in FIG. 4) of the AFE 975 may be configured to sense the voltage and current, respectively, at a point in the transmitter 400 (see discussion of FIG. 4 above). The linear networks and active elements 978 may be configured to ensure that the sensed voltage and the sensed current input are properly scaled and compensated so that any performed calculations based on the sensed voltage and the sensed current are accurate. As discussed above, the voltage filter/phase compensation circuit 905, the current filter/phase compensation circuit 906, the voltage amplitude scaling circuit 910, and the current amplitude scaling circuit 911 represent the linear networks and active elements 978.

The voltage filter/phase compensation circuit 905 may receive the $V_{sense}$ input signal and may filter the signal and provide any needed phase compensation, providing an output that may be fed to an input of the voltage amplitude scaling circuit 910. Similarly, the current filter/phase compensation circuit 906 may receive the $I_{sense}$ input signal and may filter the signal and provide phase compensation to the phase of the current input $I_{sense}$, providing an output that may be fed to an input of the current amplitude scaling circuit 911. The phase compensation as provided by the voltage and current filter/phase compensation circuits 905 and 906 may be utilized to ensure that the phases of the voltage signal $V_{sense}$ and the current signal $I_{sense}$ are not influenced or affected by the voltage sensor 432 and current sensor 434 and that relative phase shifts between the two signals are not influenced or otherwise affected by any upstream components.

The voltage amplitude scaling circuit 910 may receive the filtered and compensated voltage signal output from the voltage filter/phase compensation circuit 905 and may be configured to scale the amplitude of the voltage signal. Similarly, the current amplitude scaling circuit 911 may receive the filtered and compensated current signal output from the current filter/phase compensation circuit 906 and may be configured to scale the amplitude of the current signal. The scaling of one or both of the voltage and current signals may be performed as desired to ensure that the voltage and current signals have nearly similar amplitudes with each other, which may be useful in ensuring that the downstream zero-crossing detectors 915 and 916 are functioning properly and may be useful in avoiding errors that may be associated with unmatched amplitudes (for example, improper zero-crossing detections). An output from each of the voltage amplitude scaling circuit 910 and the current amplitude scaling circuit 911 may be fed to an input of the voltage zero-crossing detector 915 and an input of the current zero-crossing detector 916, respectively. In some embodiments, the voltage and current amplitude scaling circuits 910 and 911 may be configured to limit the amplitudes to be within 10% of each other. In some embodiments, the voltage and current amplitude scaling circuits 910 and 911 may be configured to limit the amplitudes to be within any range of each other, as established by the power and impedance measurement circuit 430 or a user, etc.

Additionally, the output of the voltage filter/phase compensation circuit 905 may be coupled to the voltage peak detector 955, an output of which, $V_{peak}$, may be coupled as an input to the analog/digital (A/D) converter 940. The output of the voltage amplitude scaling circuit 910 may be coupled to the voltage zero-crossing detector 915 as an input. Additionally, the output of the current filter/phase compensation circuit 906 may be coupled to the current peak detector 956, an output of which, $I_{peak}$, may be coupled as an input to the A/D converter 940. The output of the current amplitude scaling circuit 911 may be coupled to the current zero-crossing detector 916 as an input.

Outputs of the zero-crossing detectors 915 and 916 may be coupled to the XOR gate 920, the output of the voltage zero-crossing detector 915 comprising one input of the XOR gate 920 and the output of the current zero-crossing detector 916 comprising another input to the XOR gate 920. The zero-crossing detectors 915 and 916 may also be coupled to the sequence controller 950. The output of the XOR gate 920 may be coupled to a sample/hold switch 925 as an input.

The phase detection circuit 976 comprises the voltage zero-crossing detector 915, operably connected to the voltage amplitude scaling circuit 910, the current zero-crossing detector 916, operably connected to the current amplitude scaling circuit 911, and the XOR gate 920 that may be used to detect the phase offset between the voltage and current signals $V_{sense}$ and $I_{sense}$ operably connected to the zero-crossing detectors 915 and 916.

The voltage zero-crossing detector 915 may be configured to detect a zero crossing of a sinusoidal wave of the voltage signal output by the voltage filter/phase compensation and amplitude scaling circuits 905 and 910, respectively. The voltage zero-crossing detector 915 may be configured to generate an output signal indicating when the voltage signal crosses zero. The current zero-crossing detector 916 may be configured to detect a zero-crossing of a sinusoidal wave of the current signal output by the current filter/phase compensation and amplitude scaling circuits 906 and 911, respectively. The current zero-crossing detector 916 may be configured to generate an output signal indicating when the current signal crosses zero. The use of zero-crossing detectors 915 and 916 may reduce offset errors. In some embodiments, high speed comparators may implement the zero-crossing detectors 915 and 916. As will be discussed in further detail below, an amount of time between the zero crossings of the voltage signal and the current signal may represent or indicate a phase offset between the voltage signal and the current signal. As described below, the power and impedance at the transmit antenna 414 may be measured based on the current, the voltage, and the phase offset between the current and the voltage.

The XOR gate 920 may be configured to receive the output signals generated by the voltage and current zero-crossing detectors 915 and 916, respectively. The XOR gate 920 may receive the two inputs and may be configured to generate an output when either, but not both, of the inputs, indicating the voltage and current zero-crossings, are high (i.e., "1"). For example, when the voltage zero-crossing signal has a value of "1" and the current zero-crossing signal has a value of "0," the XOR gate 920 will generate an output of "1." However, if both the voltage zero-crossing signal and the current zero-crossing signal have a value of either "0" or "1," then the XOR gate 920 will generate an output of "0." Thus, for each cycle, the XOR gate 920 may generate two outputs (i.e., the XOR gate 920 may generate an output when one of the voltage/current signals cross zero as the AC signal is positive and again as the voltage/current signals cross zero as the AC signal goes negative). The XOR gate 920 may be replaced with other combinations of logic gates, other logic circuitry, or other phase detector implementations. The XOR gate 920, by its output when one of the zero-crossing signals is a value of "1," may provide phase detection between the voltage and current signals. Accordingly, the XOR gate 920 may detect the phase offset between the voltage and current signals and output a signal indicative or representative of that phase offset.

Some embodiments described herein may detect the magnitude of the phase offset between the voltage and current signals. Additional circuitry not described herein may be implemented to distinguish between inductive and capacitive phase shifts as desired, for example, if the load impedance range includes both capacitive and inductive loads.

The sample/hold switch 925 may be coupled to the sequence controller 950 receiving a control signal from the sequence controller 950 (i.e., a signal provided by the sequence controller 950 may control whether the sample/hold switch 925 is in an open state or a closed state). The output of the sample/hold switch 925 may be coupled to a switch 926 as a control signal for the switch 926 (i.e., the generated output of the sample/hold switch 925 may control whether the switch 926 is in an open or closed state). The sample/hold switch 925 may be controlled by the sequence controller 950, which may also control the zero-crossing detector(s) 915 and 916 and control the discharge switch 927 and the calibration switch 928. When the switch 926 is activated (i.e., in the closed state), the dynamically variable current source 930 may be coupled to the capacitor 935 and may be configured to generate a current. The capacitor 935 may have a capacitance equal to $C_{ph}$. In some embodiments, the capacitor 935 may have a working voltage (i.e., a voltage capacity or rating) that may define the highest voltage that may be applied across the capacitor 935 without risk of degrading the capacitor 935. The discharge switch 927 may be configured to reset or discharge the capacitor 935, for example, when the discharge switch 927 is in a closed state, the two sides of the capacitor 935 are short circuited and thus the capacitor 935 is discharged. As discussed above, the discharge switch 927 may be coupled to the sequence controller 950, receiving a control signal from the sequence controller 950 (i.e., a signal provided by the sequence controller 950 may control whether the discharge switch 927 is in an open state or a closed state).

The A/D converter 940 may be coupled to the capacitor 935 such that a phase sense voltage ($V_{ph}$) of the capacitor 935 is fed into the A/D converter 940. Additionally, as described above, the A/D converter 940 may be coupled to the voltage peak detector 955 and the current peak detector 956 receiving their respective outputs as inputs to the A/D converter 940. The output of the A/D converter 940 may be coupled to a processor (not shown in this figure) configured to perform the voltage, current, power and impedance computation ("PIC") circuit 945. In some embodiments, the A/D converter 940 may be integrated into the controller 415 of the transmitter 400. In some embodiments, the A/D converter 940 may be a stand-alone processors/conversion circuit (not shown). In some embodiments, the A/D converter 940 may be integrated into the PIC circuit 945. In some embodiments, the PIC circuit 945 may comprise a dedicated processor for the voltage, current, power and impedance measurement circuit 430. In some embodiments, the PIC circuit 945 may comprise the controller 415 of the transmitter 400 as referenced in FIG. 4. In some embodiments, the PIC circuit 945 may comprise other circuitry and processing equipment. The PIC circuit 945 may be coupled to the dynamically variable current source 930, such that a signal from the PIC circuit 945 may control the dynamically variable current source 930. For example, the PIC circuit 945 may control the dynamically variable current source 930 to output a higher or a lower reference current based on the signal from the PIC circuit 945. Additionally, as discussed briefly in relation to FIG. 4, the PIC circuit 945 may be coupled to controller 415 or any other component as referenced in FIG. 4 and communicate any of the determined information to the controller 415 so the controller 415 may alter the signals being generated by the transmitter 400. The PIC circuit 945 may be coupled (not shown in this figure) to at least one of the controller 415, oscillator 423, driver circuit 424, and filter 408 referenced in FIG. 4.

The sequence controller 950 discussed above may also be coupled to the calibration switch 928 as a control signal (i.e., a signal from the sequence controller 950 may control whether the calibration switch 928 is in an open state or a closed state). The calibration switch 928 may couple a reference waveform generator 960 to each of the $V_{sense}$ and $I_{sense}$ input signals coupled to the inputs of the voltage filter/phase compensation circuit 905 and current filter/phase compensation circuit 906. A phase delay circuit 965 may also be coupled to the reference waveform generator 960 and at least one of the $V_{sense}$ or $I_{sense}$ input signals such that a generated reference waveform by the reference waveform generator 960 may be fed into the $V_{sense}$ or $I_{sense}$ inputs with a known phase delay.

Additionally (as described above), the filtered and phase compensated voltage and current outputs may be input into the respective peak detectors 955 and 956. The voltage peak detector 955 may be configured to determine a peak value for the coupled voltage signal. Similarly, the current peak detector 956 may be configured to determine a peak value for the coupled current signal. The outputs of the peak detectors 955 and 956 may represent analog signals proportional to a size of the peak values of the respective AC voltage and current input signals. These outputs may be provided to the A/D converter 940. The voltage and current peak detectors 955 and 956, respectively, may be configured to continuously monitor the voltage and current input signals, respectively, and continuously provide outputs to the A/D converter 940.

The voltage, current, power and impedance measurement system 977 may comprise the output of the XOR gate 920 coupled to the input of sample/hold switch 925. The sample/hold switch 925 may be configured to activate (i.e., enter a closed state) in response to a signal from the sequence controller 950. When activated, the sample/hold switch 925 may be configured to couple the output of the XOR gate 920 to the control input of the switch 926, such that the output of the XOR gate 920 acts as the control signal to the switch 926. Accordingly, the switch 926 may be configured to activate (i.e., enter a closed state) in response to the output of the XOR gate 920, the output representing the phase offset between the voltage and current signals. Thus, the switch 926 may be configured to couple the dynamically variable current source 930 to the capacitor 935 for the duration of the phase offset between the voltage and current signals. The capacitor 935 may be configured to integrate the current $I_{ref}$ received from the dynamically variable current source 930 through the switch 926 over a period of time proportional to the phase offset between the voltage and current signals (i.e., the output of the XOR gate 920). In some embodiments, the application of the voltage, current, power and impedance measurement system 977 may determine the size of the capacitor 935. The size of the capacitor 935 may be related, at least in part, to the frequency and/or the phase of the measured current and voltage signals. The A/D converter 940 may measure or sample the phase sense voltage. The phase sense voltage ($V_{ph}$) may represent the voltage across the capacitor 935 (or the voltage equal to the result of the integration performed by the capacitor 935). The A/D converter 940 may then measure (sample) the peak voltage $V_{peak}$ and peak current $I_{peak}$. The three sensed or measured values $V_{ph}$, $V_{peak}$, and $I_{peak}$ may be used to calculate a phase difference between the voltage and current signals using equation 6:

$$\text{Phase Difference} = (2*\pi*\text{Frequency})*V_{ph}*C_{ph}/I_{ref} \quad (6)$$

Equation 6 comprises the frequency of the measured voltage and current signal (e.g., 6.78 MHz for a wireless power system), the phase sense voltage $V_{ph}$ corresponding to the voltage across the capacitor 935 after receiving the input current $I_{ref}$ for a duration of time corresponding to a phase offset between the sensed voltage $V_{sense}$ and a sensed current $I_{sense}$. The dynamically scaled (variable) current $I_{ref}$ may represent the current fed into the capacitor 935, while $C_{ph}$ may represent the capacitance of the capacitor 935. The PIC circuit 945 may calculate a power transmitted using the same measured information. The PIC circuit 945 may use Equation 2 below to calculate the amount of power transmitted by the transmitter 400. Additionally, Equation 6 depicts the calculation that may be used to determine the phase difference over a single pulse. However, Equation 6 may be modified for use with a full cycle of the voltage and current signals that may include two pulses per cycle. Equation 6 may be modified by dividing the phase difference calculation by 2 to account for the two pulses that may exist for the full cycle of the voltage and current signals. Thus, Equation 6 may be modified as follows: Phase Difference= $(2*\pi*\text{Frequency})*V_{ph}*C_{ph}/2*I_{ref}$. Equation 6 may be further modified to account for determining the phase difference over multiple cycles. Equation 6 may be further modified as follows: Phase Difference=$(2*\pi*\text{Frequency}) *V_{ph}*C_{ph}/2*(\text{Number of Cycles})*I_{ref}$.

Equation 7 may provide for the determination of the power based on the determined phase difference.

$$\text{Power} = V_p/\sqrt{2} * (I_p/\sqrt{2}) * \cos[\Phi] \quad (7)$$

In Equation 7, the variable $V_p$ may represent the peak voltage and determined by the voltage peak detector 955, while the variable $I_p$ may represent the peak current as determined by the current peak detector 956. The variable $\Phi$ may represent the phase difference determined using Equation 6. The PIC circuit 945 may also be configured to calculate an impedance observed by the transmitter 400 with the information acquired as described above. Equation 8 below may be used by the PIC circuit 945 to calculate the impedance as seen by the transmit antenna 414 of the transmitter 400.

$$\text{Impedance} = V/(\text{Complex}(I)) \quad (8)$$

In Equation 8, the V is the voltage and the I is the current. The dynamically variable current source 930, as described above, may be configured to provide the current to the capacitor 935 through switch 926. The dynamically scalable feature of the dynamically variable current source 930 may provide for the ability to fine-tune or more accurately and precisely determine phase difference. As the current from the dynamically variable current source 930 is integrated over a period of time proportional to the phase offset between the voltage and current signals, the phase sense voltage $V_{ph}$ is generated in the capacitor 935 (i.e., the voltage across the capacitor 935 is based on the current input from the dynamically variable current source 930 over the phase offset time). The ability to dynamically adjust the output of the dynamically variable current source 930 may provide for better control of the amount of voltage allowed to accumulate in the capacitor 935, where the relationship of the voltage in the capacitor 935 $V_{ph}$ to a maximum voltage of the capacitor 935, may adversely impact the accuracy or the reliability of the phase difference calculation based on the $V_{ph}$.

For example, if the voltage in the capacitor 935 is low (i.e., less than 5% of a maximum voltage of the capacitor 935) or high (i.e., greater than 95% of the maximum voltage of the capacitor 935), the output current of the dynamically variable current source 930 may be adjusted such that the voltage accumulating in the capacitor 935 is more "centered" within the range of capacitor 935, where it may be more reliably and accurately measured. Accordingly, in Equation 6 above, if the $V_{ph}$ is lower than a threshold given a known value of the maximum voltage for the capacitor, then the current $I_{ref}$ from the dynamically variable current source 930 may be increased for a small phase difference. Alternatively, if the $V_{ph}$ is higher than a threshold given a known value of the maximum charge of the capacitor 935, then the current $I_{ref}$ from the dynamically variable current source 930 may be reduced for a large phase difference. In some embodiments, the determination of the dynamic reference current may be tied to the previous phase measurement itself. For example, a coarse measurement (including saturation conditions min/max $V_{ph}$) may be obtained using a default reference current, and then the reference current $I_{ref}$ may be adjusted to obtain a fine estimate. For example, if the actual phase between the voltage and current signals was 45 degrees, the initial coarse estimate using the default $I_{ref}$ may calculate a phase difference of 40-50 degrees and then $I_{ref}$ may be adjusted to an appropriate value which will narrow the determined phase difference down closer to 45 degrees. Various other calculation methods may be applied to determine the phase difference using a dynamically scalable current source. The determination of the ideal $I_{ref}$ from the dynamically variable current source 930 may be an iterative process. The $I_{ref}$ from the dynamically variable current source 930 may be adjusted many times until the most reliable and accurate phase sense voltage $V_{ph}$ is identified.

The reference current $I_{ref}$ from the dynamically variable current source 930 may be adjusted (or dynamically scaled) to improve the precision of the phase sense voltage measurement and resulting phase difference calculation by using a multi-step approach. The initial phase measurement may be determined using a predetermined initial reference current $I_{ref}$. This initial measurement may be a "coarse measurement." Based on the phase sense voltage, the reference current $I_{ref}$ may be dynamically scaled to improve the precision, accuracy, and reliability of the phase measurement, thus generating a "fine measurement."

The sequence controller 950 may be configured to control the number of cycles over which the phase difference may be performed. For example, when the phase difference is to be determined over a single cycle, the sequence controller 950 may be configured the control the zero-crossing detectors 915 and 916 to generate outputs for a phase offset signal comprising a "single phase cycle" pulse that may comprise two pulses per cycle (i.e., a pulse or signal indicating each time the voltage and current signals cross zero, which, as described above, occurs two per single phase cycle) or a single phase cycle between the voltage and current signals from the voltage zero-crossing detector 915 and the current zero-crossing detector 916, respectively, and then the voltage, current, power and impedance measurement system 977 may calculate the phase difference based on the single "phase cycle" pulse. Alternatively, when the phase difference is to be determined over multiple cycles, the sequence controller 950 may be configured to control the zero-crossing detectors 915 and 916 to generate outputs corresponding to a phase offset signal representing "multiple phase offset pulses" (i.e., a signal indicating multiple phase offsets, wherein each cycle of the multiple phase cycles comprises two pulses, such that the total number of pulses is the number of cycles*2) or a plurality a phase cycles between the voltage and current signals from the voltage zero-crossing detector 915 and the current zero-crossing detector 916, respectively. A single phase cycle may comprise a single sine wave cycle. When performing the subsequent phase difference calculation, the resulting phase difference may then be averaged over the multiple cycles. This averaging method may provide a more accurate representation of an actual phase difference between the voltage and current signals that will show less influence by potential spikes in interference or other potentially detrimental, temporary, influences in the voltage or current signals themselves or presenting in the circuitry or from environmental or computational factors. In some embodiments, the phase measurement may be performed over multiple cycles or over a period of time over which all phase offsets are to be averaged (i.e., the number of phase offsets that are detected over a 10 ms period).

Additionally, the sequence controller 950 may be responsible for resetting/discharging the capacitor 935, which may be performed before each phase measurement. As discussed above, sequence controller 950 may be coupled to the discharge switch 927 as a control signal. Accordingly, the sequence controller 950 may be configured to output a signal to the discharge switch 927, and the discharge switch 927 may be configured to enter a closed state in response to the signal from the sequence controller 950. When the discharge switch 927 is in the closed state, the two conductors of the capacitor 935 may be coupled together, thus shorting the capacitor 935 and discharging it (i.e., removing all charge from the capacitor 935). Once the capacitor 935 is discharged, the sequence controller 950 may be configured to remove the output signal to the discharge switch 927, and the discharge switch 927 may enter the opened state and the capacitor 935 will remain in its discharge state until current is again applied to it. Discharging the capacitor 935 may function as a reset of the voltage, current, power and impedance measurement system 977 in that the phase sense voltage $V_{ph}$ is cleared and the capacitor 935 and associated power and impedance measurement system components are ready to measure and calculate another phase difference.

In some embodiments, the PIC circuit 945 and the sequence controller 950 may be separate from the voltage, current, power and impedance measurement circuit 430. In some embodiments, the dynamically variable current source 930 may receive a signal from the PIC circuit 945, the signal indicating a request to increase or decrease the current based on a voltage of the capacitor 935. In some embodiments, the dynamically variable current source 930 may be separate from the voltage, current, power and impedance measurement circuit 430, and instead be a current input received by the voltage, current, power and impedance measurement circuit 430 to feed the capacitor 935.

The PIC circuit 945 and the sequence controller 950 may also provide for control over the calibration procedure, which may be performed at any time. Calibration may comprise generating a reference waveform via reference waveform generator 960 and feeding that waveform into the $V_{sense}$ and $I_{sense}$ inputs with a known phase delay. The AFE 975, the zero crossing and phase detection circuit 976, and the voltage, current, power and impedance measurement system 977 may perform the functions described above to generate a determined phase difference between the voltage and current signals. Since the calibration process involves feeding a reference waveform into the $V_{sense}$ and $I_{sense}$ inputs, the measured and determined phase difference may be compared with a known (or expected) phase difference that may be determined based on the reference waveform and the known phase delay. Based on the comparison of the measured and determined phase difference and the expected phase difference, a calibration routine may characterize and compensate for any determined phase measurement error between the voltage and current signals by introducing various calculation parameters into the PIC circuit 945 or by adjusting the individual components responsible for the phase measurement error.

The PIC circuit 945 may also provide for offline harmonic correction. For example, the total output power of the transmitter 400, may be a sum of the powers of various frequency harmonics. The voltage filter/phase compensation circuit 905 and a current filter/phase compensation circuit 906 may be configured to filter out the fundamental components of voltage and current in measuring the phase difference between the voltage and current signals and the peak amplitudes of the voltage and current signals. Accordingly, since the "other" harmonics are filtered out, the power content of these other harmonics is lost. For example, if the zero-crossing method measures power at the fundamental frequency, the power at the remaining other harmonic frequencies is ignored as they are filtered out and the determined transmitted power is never equal to the total power because of the power lost at the other harmonic frequencies. The method described above may measure the power at any single frequency if a tunable filter is used. Although many implementation details are described with respect to FIG. 7 and FIG. 9, they merely illustrate examples of the measurements of the voltage, current, power and impedance measurement circuit 430 of FIG. 4 and many other implementations are possible that would achieve the desired measurements of the signals described herein.

In wireless power systems, harmonic power content (power at harmonic frequencies) may be a function of at least one of load impedance, load current, load power, power amplifier supply voltage, etc., where other correlating factors may be dependent upon the system. During system design, the entire load impedance range and output power levels may be pre-determined. The power harmonics as a function of the correlating factors described above (e.g., load impedance, load current, load power, power amplifier supply voltage, etc.) may be measured and stored in the PIC circuit 945. Accordingly, the power measurement performed above (i.e., Equation 7) may be corrected for power "lost" at other harmonic frequencies by adding to the measured fundamental power the harmonic powers based on the values stored in the PIC circuit 645.

Figure 10:
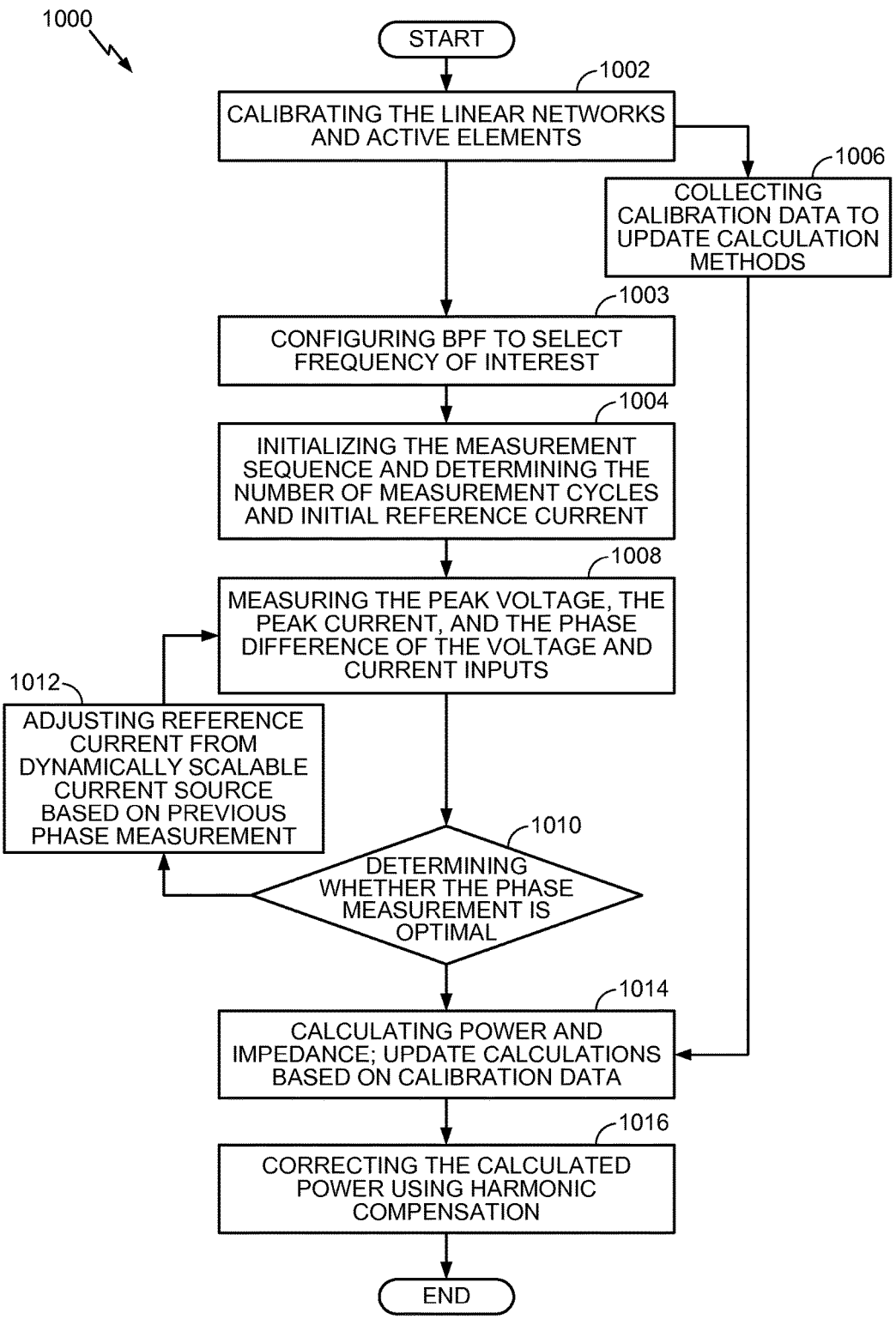
FIG. 10 is a flow chart of a method for measuring high frequency AC power and load impedance in wireless power systems.

FIG. 10 is a flow chart of a method for measuring high frequency AC power and load impedance in wireless power systems, referred to as process 1000. Process 1000 may be performed, in some aspects, by transmitter 400 and/or voltage, current, power and impedance measurement circuit 430. In some embodiments, the process 1000 may be performed by receiver 500. Process 1000 comprises functions performed for measuring and calculating an AC power and load impedance.

At block 1002, a calibration process may be performed to ensure the various components and elements of the voltage, current, power and impedance measurement circuit 430 are functioning properly. If all phase compensation and amplitude scaling components are determined to be functioning properly, the process moves to block 1004. If the calibration process determines that any of the components are no longer calibrated, then process moves to block 1006, where the calibration data may be determined and collected before being and communicated to the calculation elements and calculation block 1014 below.

At block 1003, the controller 980 configures the band pass filters 905 and 906 (FIG. 9) to select the frequency of interest for voltage and current measurement. The frequency selected can be a harmonic frequency of a fundamental power transfer frequency, or can be a frequency other than a harmonic of the fundamental power transfer frequency.

At block 1004, the measurement initialization process begins, including determining the number of measurement cycles to run and determining how many cycles over which the phase difference is to be measured and determined. In some embodiments, the initialization block 1004 may comprise resetting the capacitor 935 and preparing for the phase measurement process. Once the initialization process is complete, the process 1000 proceeds to block 1008. Resetting the capacitor 935 may be controlled by the sequence controller 950, which may control discharge switch 927 to reset the capacitor 935 upon command.

At block 1008, the current reference is adjusted. For the initial measurement, the current reference $I_{ref}$ from the dynamically variable current source 930 may be set at a preset value that is constant for all initial phase measurements. For subsequent phase measurements, the $I_{ref}$ current reference may be adjusted as discussed above. The PIC circuit 945 may determine to adjust the $I_{ref}$ current reference and the amount to adjust it. For example, if the phase difference is determined to be small, then the current reference $I_{ref}$ is increased. When the phase difference is determined to be large, then the reference current $I_{ref}$ is decreased. After the desired reference current $I_{ref}$ is identified, the process 1000 proceeds to block 1010. In some embodiments, alternative algorithms or determinative methods may be used to identify the reference current $I_{ref}$ producing the most precise, accurate, and reliable phase difference measurement and calculation.

At block 1010, the peak voltage and the peak current are measured by the voltage peak detector 955 and the current peak detector 956, and the phase using the phase detection circuit 976. Then the process 1000 proceeds to block 1012. At block 1012, the AC power and load impedance computation circuit 945 determines if the phase measurement from block 1010 is optimal. If the phase measurement is determined to be optimal, then the process 1000 progresses to block 1014. If the phase measurement is not optimal, then the process 1000 returns to block 1008 to adjust the reference current and to repeat the measurements and determination of optimal measurements. The PIC circuit 945 may make the determination.

At block 1014, power and impedance are determined using the information determined and measured at block 1010. If the initial calibration step identified that there was a phase measurement error, then compensating parameters determined and characterized by the calibration process may be factored into the power and impedance calculations at block 1014. These calculations may be performed by the processor or other circuitry configured to process the PIC circuit 945 (e.g., controller 415 of FIG. 4). After the voltage, current, power and impedance have been determined and appropriately compensated with the calibration data, the process 1000 proceeds to block 1016, where the power measurement is corrected via harmonic compensations.

Figure 11:
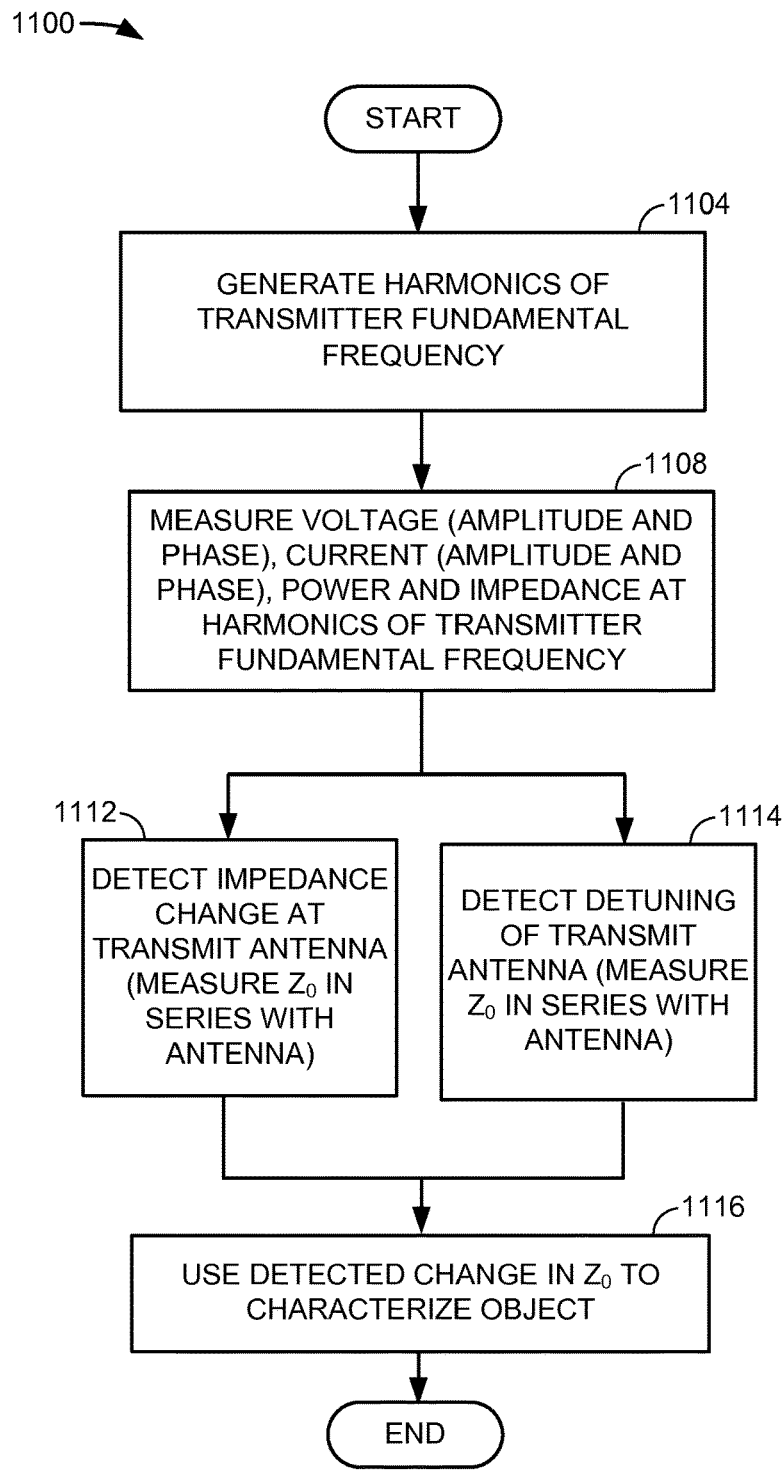
FIG. 11 is a flowchart illustrating an exemplary embodiment of a method for detecting and characterizing an object for wireless charging.

FIG. 11 is a flowchart illustrating an exemplary embodiment of a method for detecting and characterizing an object for wireless charging. The blocks in the method 1100 can be performed in or out of the order shown.

In block 1104, in an exemplary embodiment, a harmonic of the fundamental frequency is generated as a byproduct of the operation of the transmitter driver circuit 424 of FIG. 4.

In block 1108, any or all of the amplitude and phase of the voltage and current, the power and the impedance at the harmonics of the fundamental frequency are measured using at least the power and impedance measurement circuit 430 shown in FIG. 4 (e.g., more particular examples of which are shown in FIG. 7 or the circuit shown in FIG. 9). As described herein, the controller 780 or the controller 980 can be configured to determine any or all of the magnitude and phase of the voltage and current, the power and the impedance at the transmit antenna 755 at the harmonic frequency of interest.

In block 1112, an impedance change in the power transmit antenna 806 caused by the presence of an object is detected. For example, referring to FIG. 8, the change in impedance $Z_0$ is measured at the antenna 806 by the controller 780 or by the controller 980.

In block 1114, any detuning of the power transmit antenna caused by the presence of an object is detected. For example, an object may shift the resonant frequency of the antenna 806. This will result in a change in the relative magnitude of measured harmonics, which can be any one or more of voltage, current, power or impedance harmonics. For example, referring to FIG. 8, the change in impedance $Z_0$ is measured at the antenna 806 by the controller 780 or by the controller 980 as an example of detecting a shift in the resonant frequency of the antenna 806. However, a change in the relative magnitude of the harmonics can be detected using one or more of voltage, current, power or impedance harmonics.

In block 1116, the detected change in impedance $Z_0$ is used to characterize the object. For example, in an exemplary embodiment, the magnitude of the impedance or other parameter at a harmonic, or other frequency, can be compared to a threshold value, the threshold value being indicative of a type of object.

In another exemplary embodiment, the magnitude of the impedance or other parameter at a harmonic, or other frequency, can be compared against a known signature or value, or characteristic response, the known signature or value, or characteristic response being indicative of a type of object (e.g., substantially unique to that object).

In another exemplary embodiment, the magnitude of the impedance or other parameter at a harmonic, or other frequency, can be compared against the magnitude of the impedance or other parameter at a different harmonic, or different other frequency, or at multiple harmonics, or multiple other frequencies, and based on comparing these values the type of object can be identified. For example, the characteristic response, pattern or signature of an object can be represented by expected threshold impedance values over several harmonics or other frequencies.

Figure 12:
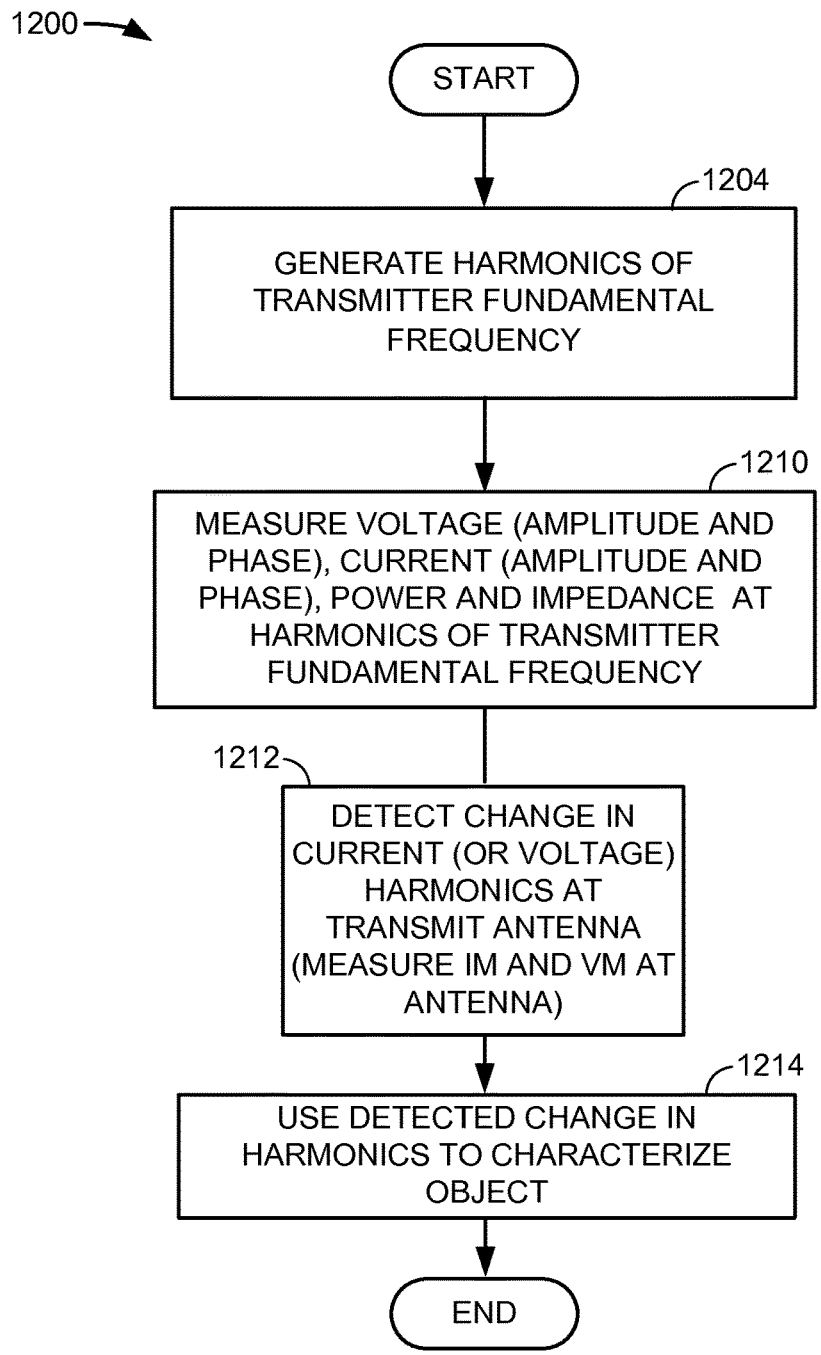
FIG. 12 is a flowchart illustrating an exemplary embodiment of a method for detecting and characterizing an object for wireless charging.

FIG. 12 is a flowchart illustrating an exemplary embodiment of a method 1200 for detecting and characterizing an object for wireless charging. The blocks in the method 1200 can be performed in or out of the order shown.

In block 1204, in an exemplary embodiment, a harmonic of the fundamental frequency is generated as a byproduct of the operation of the transmitter driver circuit 424 of FIG. 4.

In block 1210, any or all of the amplitude and phase of the voltage and current, the power and the impedance at the harmonics of the fundamental frequency are measured using at least the power and impedance measurement circuit 430 shown in FIG. 4 (e.g., more particular examples of which are shown in FIG. 7 or the circuit shown in FIG. 9) or other equivalent circuitry. As described herein, the controller 780 or the controller 980 can be configured to determine any or all of the magnitude and phase of the voltage and current, the power and the impedance at the transmit antenna 755 at the harmonic frequency of interest.

In block 1212, a change in the harmonics at the power transmit antenna caused by the presence of an object is detected. For example, referring to FIG. 8, the change in the relative magnitude of the current harmonics can be measured at the antenna 806 of the power transmitting unit. However, voltage harmonics can also be measured. The measurement of the harmonics can be obtained by measuring the voltage and the current using the circuit of FIG. 7 or the circuit of FIG. 9.

In block 1214, the detected change in harmonics is used to characterize the object as described above.

Figure 13:
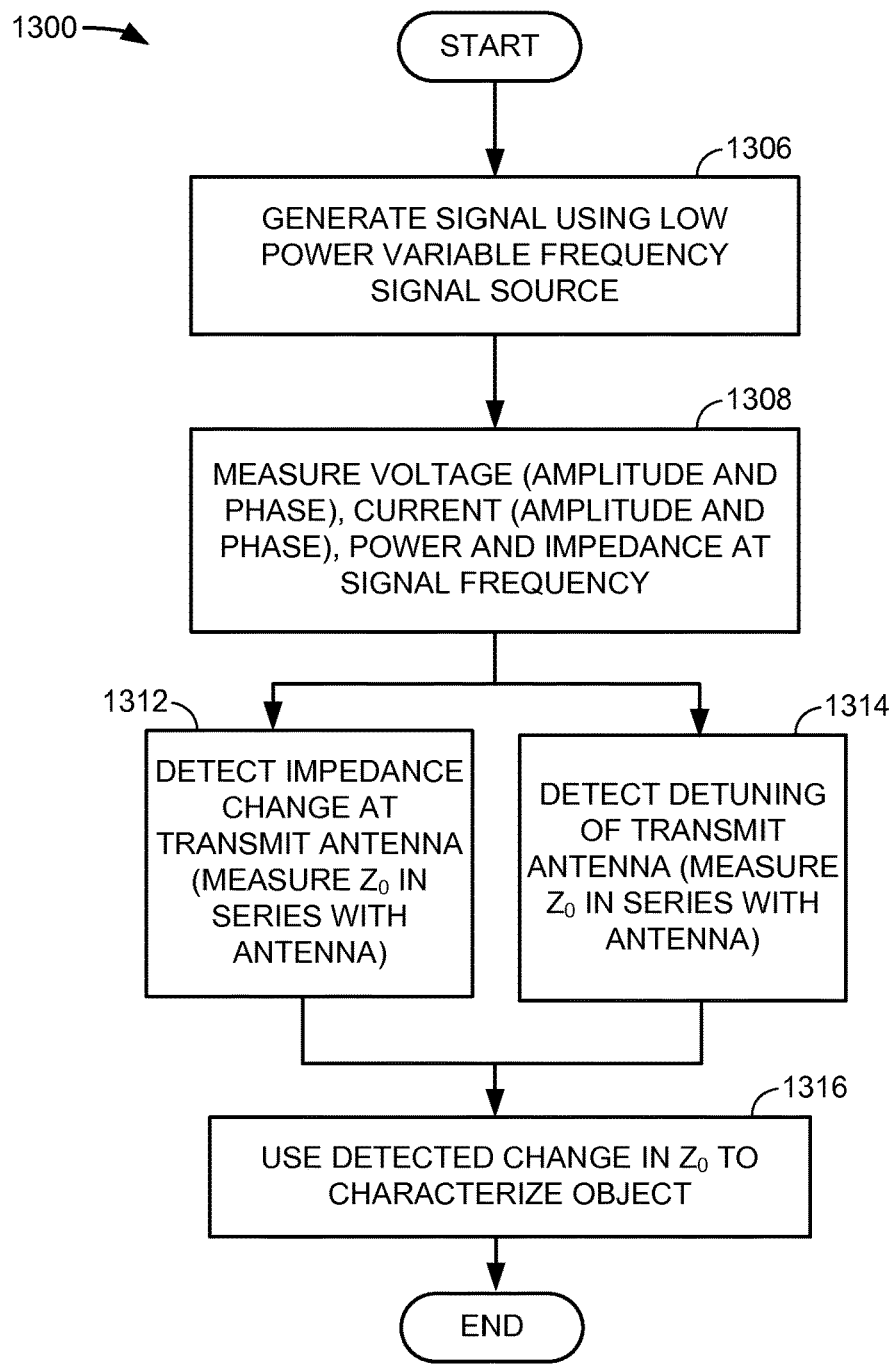
FIG. 13 is a flowchart illustrating an exemplary embodiment of a method for detecting and characterizing an object for wireless charging.

FIG. 13 is a flowchart illustrating an exemplary embodiment of a method for detecting and characterizing an object for wireless charging. The blocks in the method 1300 can be performed in or out of the order shown.

In block 1306, in an exemplary embodiment, a signal which may be a harmonic of the fundamental frequency is generated using the low power/variable frequency signal generator 785 and coupled to the transmit antenna 755 by the capacitive/inductive coupling 788 based on an input signal provided by the clock generator 710 (FIG. 7). In an alternative embodiment, the signal generated by the low power/variable frequency signal generator 785 may be at a frequency other than a harmonic of the fundamental power transmit frequency.

In block 1308, any or all of the amplitude and phase of the voltage and current, the power and the impedance at the frequency of the signal generated in block 1306 are measured using the power and impedance measurement circuit 430 (e.g., more particular examples of which are shown in FIG. 7 or the circuit shown in FIG. 9). As described herein, the controller 780, or the controller 980 can be configured to determine any or all of the magnitude and phase of the voltage and current, the power and the impedance at the transmit antenna 755 at the frequency of interest.

In block 1312, an impedance change in the power transmit antenna caused by the presence of an object is detected. For example, referring to FIG. 8, the change in impedance $Z_O$ is measured at the antenna 806 by the controller 780 or by the controller 980.

In block 1314, any detuning of the power transmit resonator caused by the presence of an object is detected. For example, an object may shift the resonant frequency of the antenna 806. This will result in a change in the relative magnitude of measured harmonics, which can be any one or more of voltage, current, power or impedance harmonics. For example, referring to FIG. 8, the change in impedance $Z_O$ is measured at the antenna 806 by the controller 780 or by the controller 980 as an example of detecting a shift in the resonant frequency of the antenna 806. However, a change in the relative magnitude of the harmonics can be detected using one or more of voltage, current, power or impedance harmonics.

In block 1316, the detected change in impedance $Z_O$ is used to characterize the object as described above.

Figure 14:
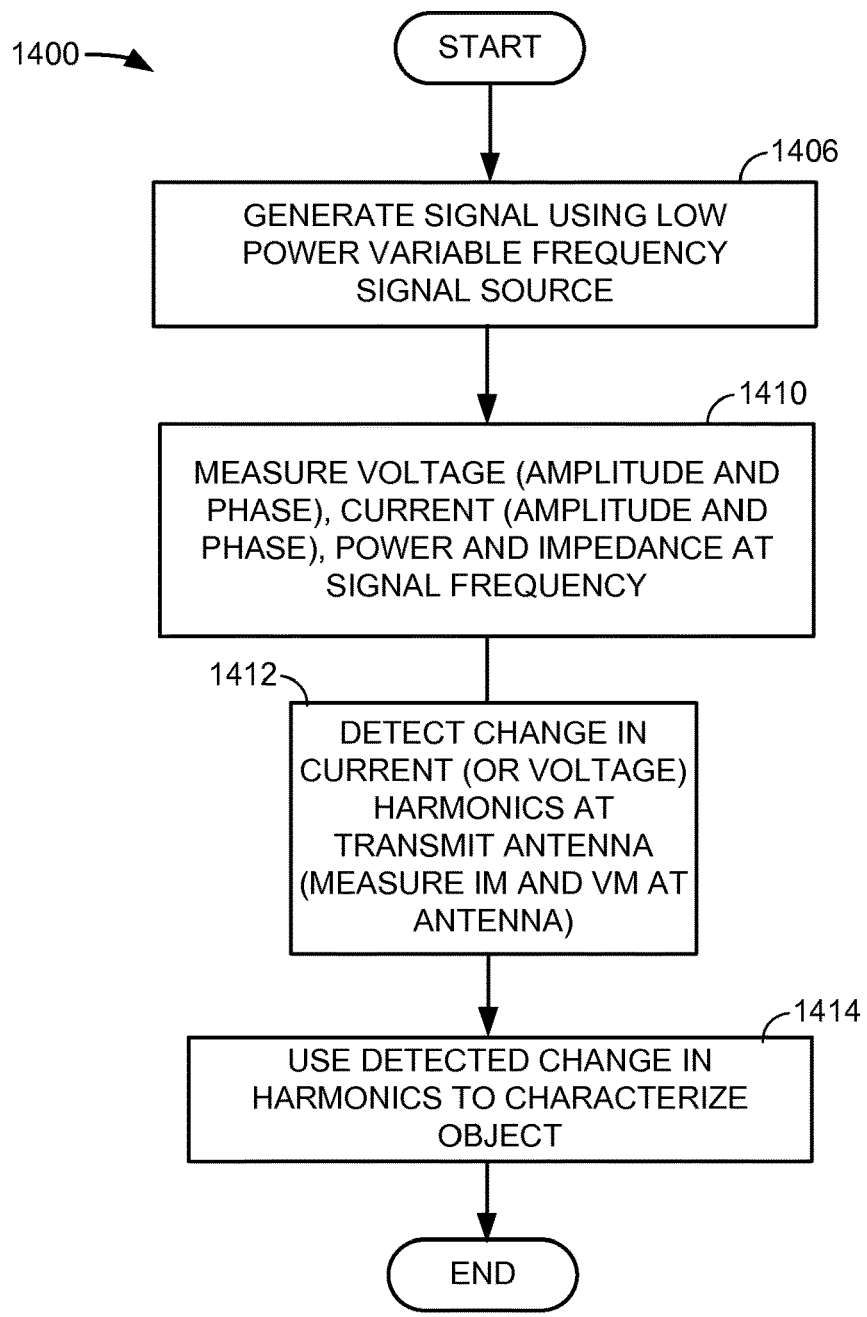
FIG. 14 is a flowchart illustrating an exemplary embodiment of a method for detecting and characterizing an object for wireless charging.

FIG. 14 is a flowchart illustrating an exemplary embodiment of a method for detecting and characterizing an object for wireless charging. The blocks in the method 1400 can be performed in or out of the order shown.

In block 1406, in an exemplary embodiment, a signal which may be a harmonic of the fundamental frequency is generated using the low power/variable frequency signal generator 785 and coupled to the transmit antenna 755 by the capacitive/inductive coupling 788 based on an input signal provided by the clock generator 710 (FIG. 7). In an alternative embodiment, the signal generated by the low power/variable frequency signal generator 785 may be at a frequency other than a harmonic of the fundamental power transmit frequency.

In block 1410, any or all of the amplitude and phase of the voltage and current, the power and the impedance at the harmonics of the fundamental frequency are measured using the power and impedance measurement circuit 430 shown in FIG. 4 (which may be implemented by FIG. 7 or the circuit shown in FIG. 9 in some embodiments). As described herein, the controller 780 or the controller 980 can be configured to determine any or all of the magnitude and phase of the voltage and current, the power and the impedance at the transmit antenna 755 at the harmonic frequency of interest. For example, the controller 980 can configure the voltage filter/phase compensation circuit 905 and a current filter/phase compensation circuit 906 to select a frequency of interest, and can be configured to measure the power and impedance or the amplitude and phase of the voltage and current at the transmit antenna 755 at the selected frequency of interest.

In block 1412, a change in the harmonics at the power transmit antenna caused by the presence of an object is detected. For example, referring to FIG. 8, the change in the relative magnitude of the current harmonics can be measured at the antenna 806 of the power transmitting unit. However, voltage harmonics can also be measured. The measurement of the harmonics can be obtained by measuring the voltage and the current using the circuit of FIG. 7 or the circuit of FIG. 9.

In block 1414, the detected change in harmonics is used to characterize the object as described above.

Figure 15:
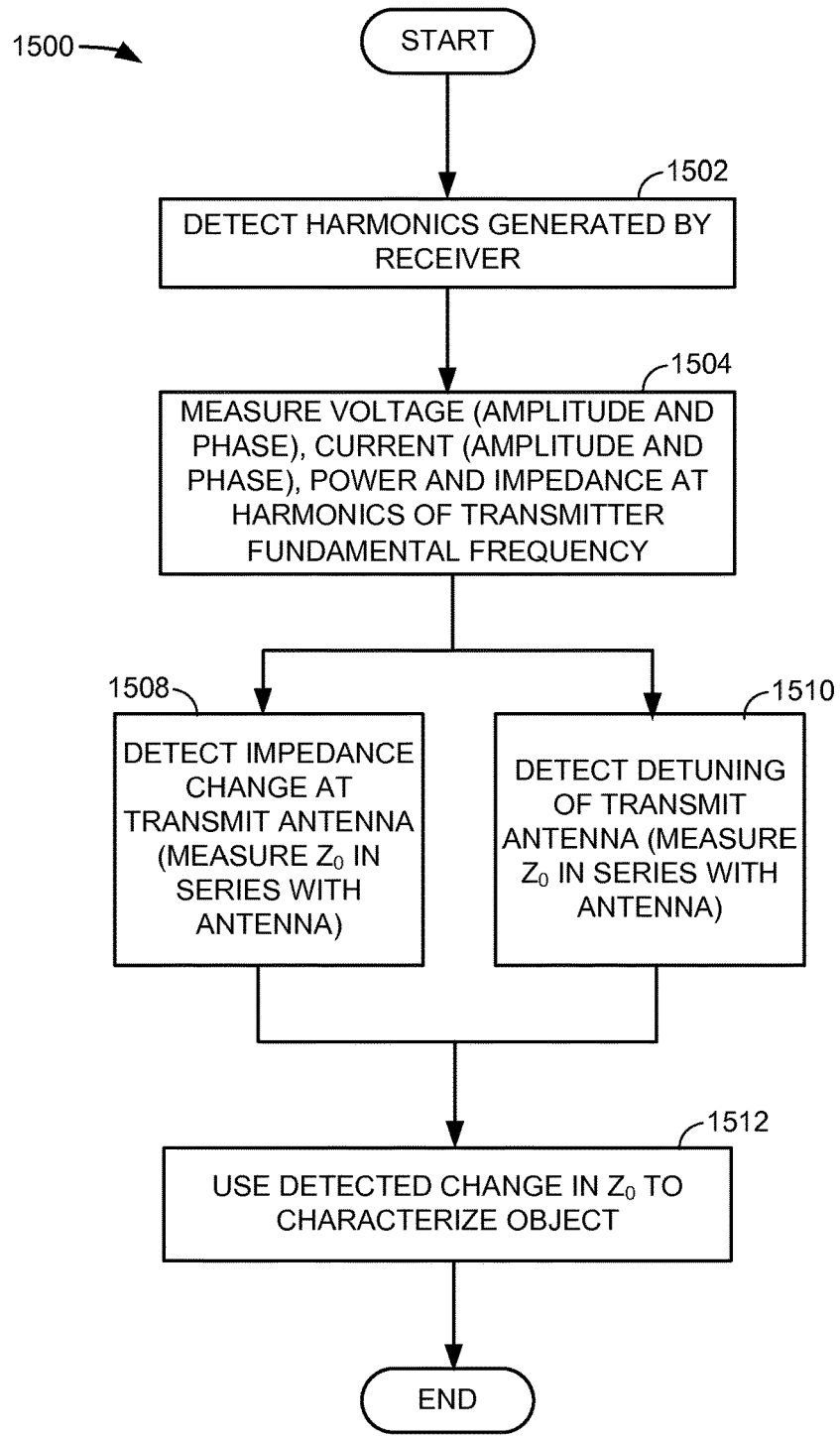
FIG. 15 is a flowchart illustrating an exemplary embodiment of a method for detecting and characterizing an object for wireless charging in which harmonics generated by a receiver are measured at a transmitter.

FIG. 15 is a flowchart illustrating an exemplary embodiment of a method 1500 for detecting and characterizing an object for wireless charging in which harmonics generated by a receiver are measured at a wireless power transmitting unit. The receiver 508 can be an example of a power receiving unit (PRU) and the transmitter 404 can be an example of a power transmitting unit (PTU). The blocks in the method 1500 can be performed in or out of the order shown.

In block 1502, a harmonic of a receiver 508 is detected at a transmitter 404. As an example of measuring a change in harmonics at the antenna 806 in the transmitter 404 caused by harmonics generated by a receiver 508 in an object located in proximity to the antenna 806, a rectifier in the receiver 508 (FIG. 5) can be implemented using diodes or other switching devices (e.g., a synchronous rectification circuit). The non-linear operation of such a switching device results in voltage and current harmonics which can be emitted out through the antenna of the receiver 508. A portion of these radiated signals couple with the antenna 806 in the transmitter 404 by vector summing and can be measured using the methodologies mentioned above in FIG. 7, FIG. 9 or a combination of FIGS. 7 and 9 or equivalents thereof. For example, a typical bridge rectifier implementation in a receiver 508 may produce odd current harmonics which can be measured at the antenna 806 in the transmitter. A passive object may not cause a substantial relative change in harmonics.

In block 1504, any or all of the amplitude and phase of the voltage and current, the power and the impedance at the harmonics of the fundamental frequency are measured using the power and impedance measurement circuit 430 (exemplary implementations of which are shown in FIG. 7 or the circuit shown in FIG. 9). As described herein, the controller 780 or the controller 980 can be configured to determine any or all of the magnitude and phase of the voltage and current, the power and the impedance at the transmit antenna 755 at the harmonic frequency of interest.

In block 1508, an impedance change in the antenna 806 caused by the presence of an object is detected. For example, referring to FIG. 8, the change in impedance $Z_0$ is measured at the antenna 806 by the controller 780 or by the controller 980.

In block 1510, any detuning of the antenna 806 caused by the presence of an object is detected. For example, a foreign object may shift the resonant frequency of the antenna 806. This will result in a change in the relative magnitude of measured harmonics, which can be any one or more of voltage, current, power or impedance harmonics. For example, referring to FIG. 8, the change in impedance $Z_0$ is measured at the antenna 806 by the controller 780 or by the controller 980 as an example of detecting a shift in the resonant frequency of the antenna 806. However, a change in the relative magnitude of the harmonics can be detected using one or more of voltage, current, power or impedance harmonics.

In block 1512, the detected change in impedance $Z_0$ is used to characterize the object as described above.

Figure 16:
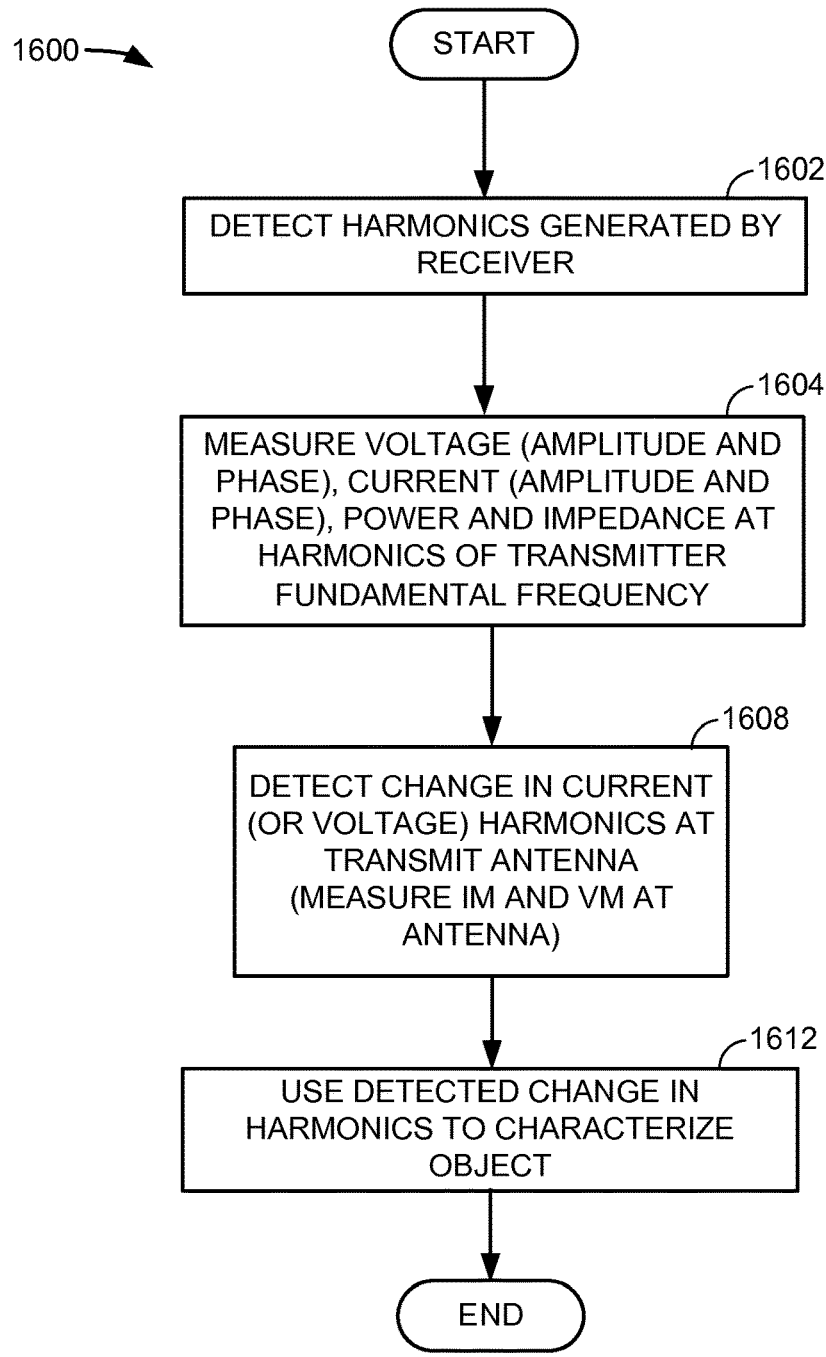
FIG. 16 is a flowchart illustrating an exemplary embodiment of a method for detecting and characterizing an object for wireless charging in which harmonics generated by a receiver are measured at a transmitter.

FIG. 16 is a flowchart illustrating an exemplary embodiment of a method 1600 for detecting and characterizing an object for wireless charging in which harmonics generated by a receiver 508 are measured at a transmitter 404. The blocks in the method 1600 can be performed in or out of the order shown.

In block 1602, a harmonic of a receiver 508 is detected at a transmitter 404. As an example of measuring a change in harmonics at the antenna 806 in the transmitter 404 caused by harmonics generated by a receiver in an object located in proximity to the antenna 806, a rectifier in the receiver 508 (FIG. 5) can be implemented using diodes or other switching devices (e.g., a synchronous rectification circuit). The non-linear operation of such a switching device results in voltage and current harmonics which can be emitted out through the antenna of the receiver 508. A portion of these radiated signals couple with the antenna 806 in the transmitter 404 by vector summing and can be measured using the methodologies mentioned above in FIG. 7, FIG. 9 or a combination of FIGS. 7 and 9 or equivalents thereof. For example, a typical bridge rectifier implementation in a receiver 508 may produce odd current harmonics which can be measured at the antenna 806 in the transmitter 404. A passive object may not cause a substantial relative change in harmonics.

In block 1604, any or all of the amplitude and phase of the voltage and current, the power and the impedance at the harmonics of the fundamental frequency are measured using the power impedance measurement circuit 430 (exemplary implementations of which are shown in FIG. 7 or the circuit shown in FIG. 9). As described herein, the controller 780 or the controller 980 can be configured to determine any or all of the magnitude and phase of the voltage and current, the power and the impedance at the transmit antenna 755 at the harmonic frequency of interest.

In block 1608, a change in the harmonics at the antenna 806 in the transmitter 404 caused by the presence of an object is detected. For example, referring to FIG. 8, the change in the relative magnitude of the current harmonics can be measured at the antenna 806 of the transmitter 404. However, voltage harmonics can also be measured. The measurement of the harmonics can be obtained by measuring the voltage and the current using the circuit of FIG. 7 or the circuit of FIG. 9 or equivalents thereof.

In block 1612, the detected change in harmonics is used to characterize the object as described above.

Figure 17:
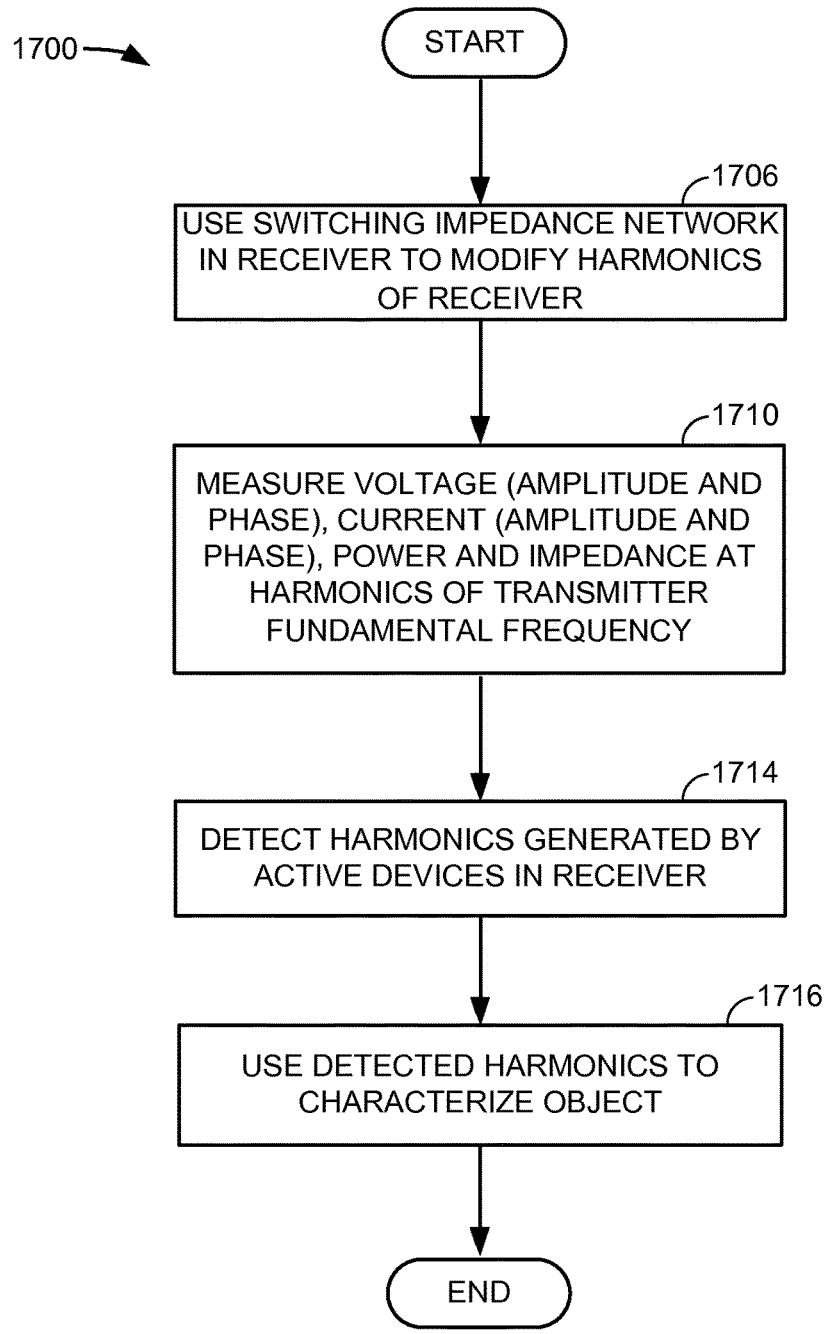
FIG. 17 is a flowchart illustrating an exemplary embodiment of a method for detecting and characterizing an object for wireless charging in which communication is established between a receiver and a transmitter.

FIG. 17 is a flowchart illustrating an exemplary embodiment of a method for detecting and characterizing an object for wireless charging in which communication is established between a receiver and a transmitter. The blocks in the method 1700 can be performed in or out of the order shown.

In block 1706, a harmonic of a receiver 508 can be modified by using a switching impedance network in the receiver 508. For example, referring to FIG. 5, impedance switching can be implemented as part of a filter network that can be part of the RX matching and switching circuitry 512. Alternatively, an external matching network can be implemented. The matching network can be configured to alter the switching components in the RX matching and switching circuitry 512 to modify the harmonics of the receive circuitry 510.

In bock 1710, any or all of the amplitude and phase of the voltage and current, the power and the impedance at the harmonics of the fundamental frequency are measured using the power and impedance measurement circuit 430 (exemplary implementations of which are shown in FIG. 7 or the circuit shown in FIG. 9). As described herein, the controller 780 or the controller 980 can be configured to determine any or all of the magnitude and phase of the voltage and current, the power and the impedance at the transmit antenna 755 at the harmonic frequency of interest.

In block 1714, the harmonics generated by the active devices in the receiver 508 (FIG. 5) are detected at the power transmit antenna 806. For example, referring to FIG. 8, the change in the relative magnitude of the current harmonics can be measured at the antenna 806 of the transmitter 404. However, voltage harmonics can also be measured. The measurement of the harmonics can be obtained by measuring the voltage and the current using the circuit of FIG. 7 or the circuit of FIG. 9 or equivalents thereof.

In block 1716, the detected harmonics are used to characterize the object as described above.

Figure 18:
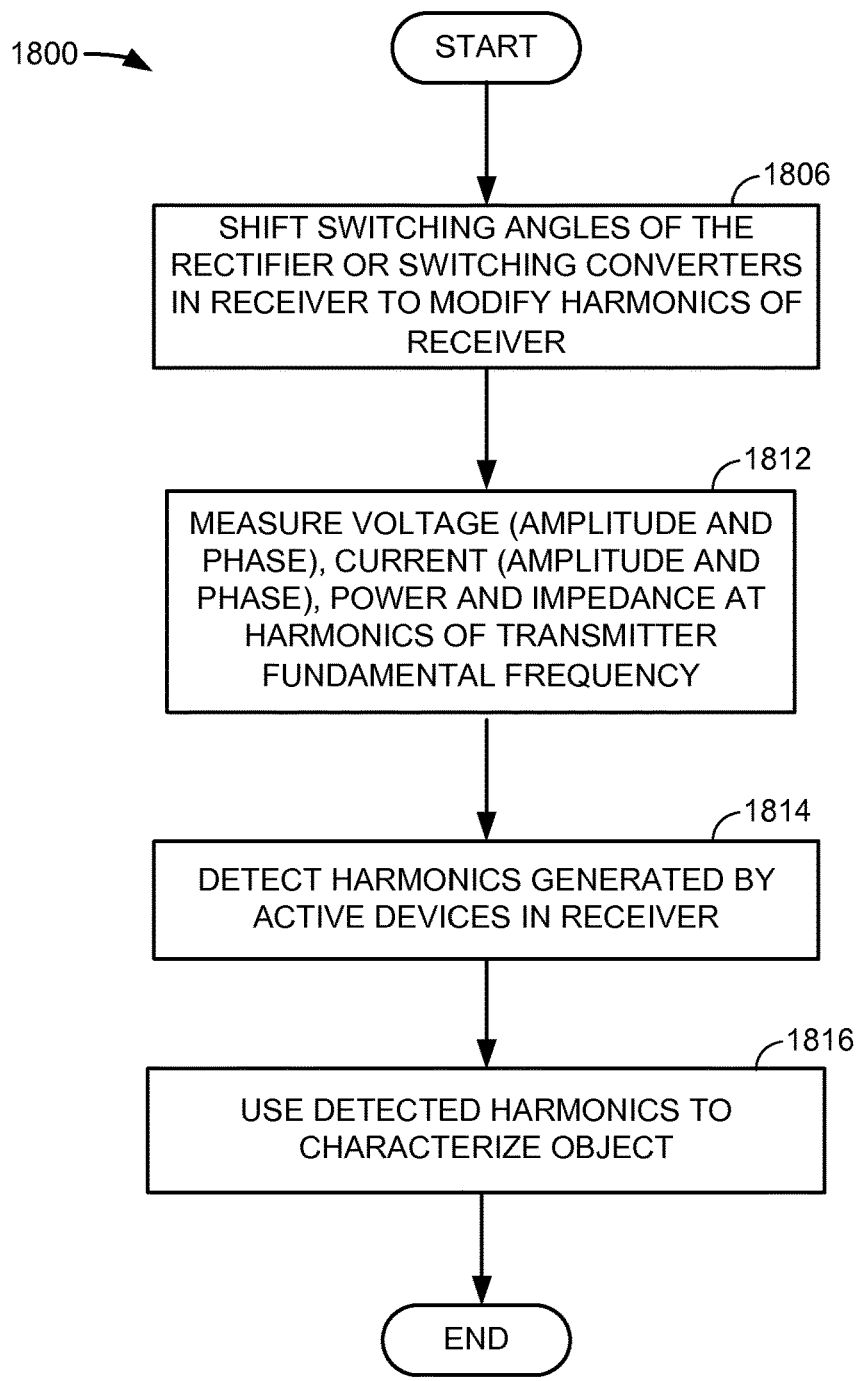
FIG. 18 is a flowchart illustrating an exemplary embodiment of a method for detecting and characterizing an object for wireless charging in which communication is established between a receiver and a transmitter.

FIG. 18 is a flowchart illustrating an exemplary embodiment of a method for detecting and characterizing an object for wireless charging in which communication is established between a receiver and a transmitter. The blocks in the method 1800 can be performed in or out of the order shown.

In block 1806, a harmonic of a receiver 508 can be modified by shifting switching angles of the rectifiers or switching converters in the receiver. For example, referring to FIG. 5, the RF-to-DC converter 520 can be implemented as a synchronous rectifier, which can be configured to use phase controlled switches. Modifying the conduction angle of these phase controlled switches can alter the harmonics generated by the receive circuitry 510. Alternatively, changing the duty cycle of the DC-to-DC converter 522 can also be used to alter the harmonics of the receiver 508.

In bock 1812, any or all of the amplitude and phase of the voltage and current, the power and the impedance at the harmonics of the fundamental frequency are measured using the power and impedance measurement circuit 430 (exemplary implementations of which are shown in FIG. 7 or the circuit shown in FIG. 9). As described herein, the controller 780 or the controller 980 can be configured to determine any or all of the magnitude and phase of the voltage and current, the power and the impedance at the transmit antenna 755 at the harmonic frequency of interest.

In block 1814, harmonics generated by active devices in the receiver 508 (FIG. 5) are detected at the power transmit antenna. For example, referring to FIG. 8, the change in the relative magnitude of the current harmonics can be measured at the antenna 806 of the transmitter 404. However, voltage harmonics can also be measured. The measurement of the harmonics can be obtained by measuring the voltage and the current using the circuit of FIG. 7 or the circuit of FIG. 9 or equivalents thereof.

In block 1816, the detected harmonics are used to characterize the object as described above.

Figure 19:
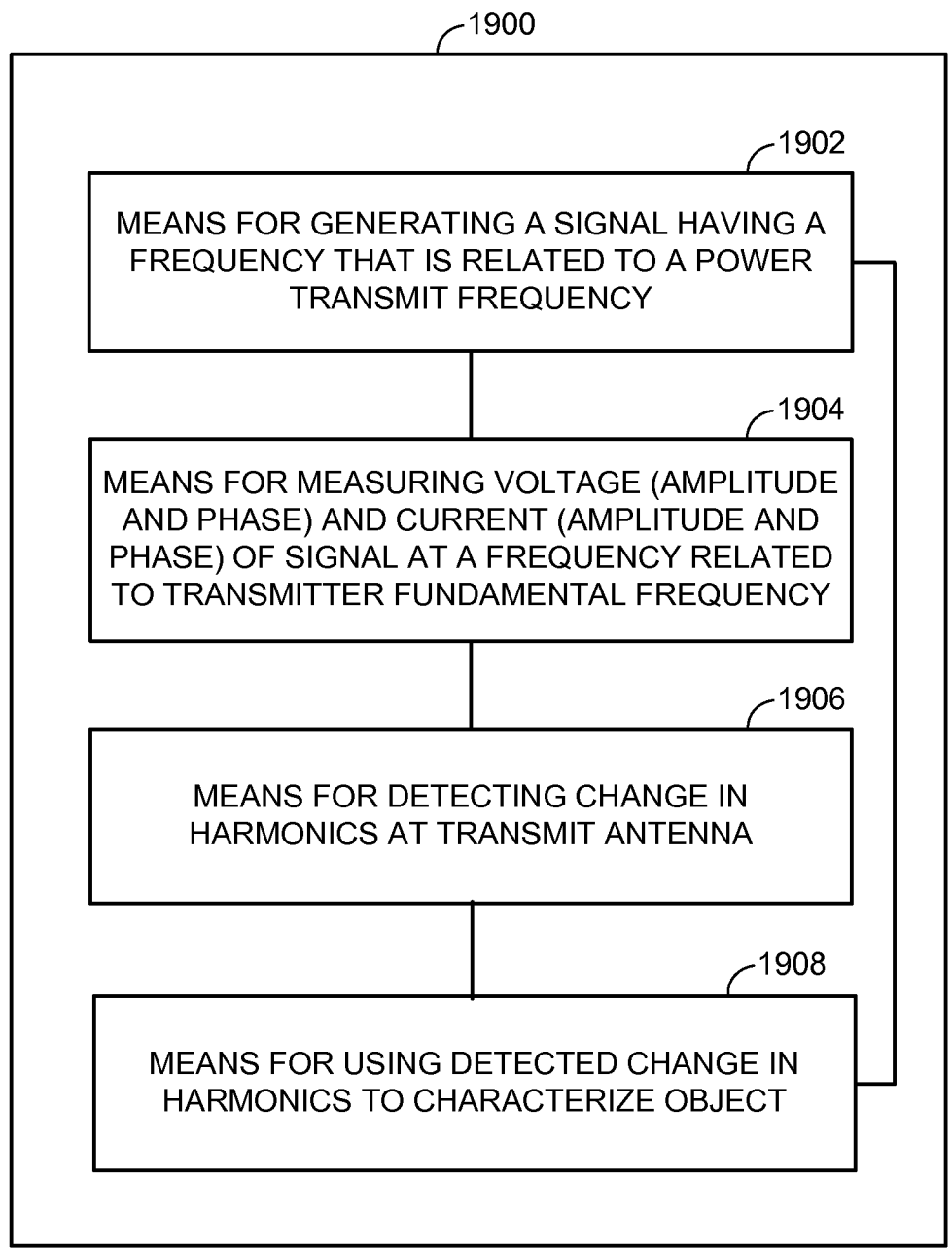
FIG. 19 is a functional block diagram of an apparatus for detecting and characterizing an object for wireless charging.

FIG. 19 is a functional block diagram of an apparatus 1900 for detecting and characterizing an object for wireless charging.

The apparatus 1900 comprises means 1902 for generating a signal having a frequency related to a power transmit frequency. In certain embodiments, the means 1902 for generating a signal having a frequency related to a power transmit frequency can be configured to perform one or more of the function described in operation block 1104 of method 1100 (FIG. 11); block 1204 of method 1200 (FIG. 12); block 1306 of method 1300 (FIG. 13); block 1406 of method 1400 (FIG. 14); block 1502 of method 1500 (FIG. 15); and block 1602 of method 1600 (FIG. 16). In an exemplary embodiment, the means 1902 for generating a signal having a frequency related to a power transmit frequency may comprise the structure shown in at least FIG. 7. The apparatus 1900 further comprises means 1904 for measuring voltage (amplitude and phase) and current (amplitude and phase) of the signal having a frequency related to a power transmit frequency. In certain embodiments, the means 1904 for measuring voltage (amplitude and phase) and current (amplitude and phase) of the signal having a frequency related to a power transmit frequency can be configured to perform one or more of the function described in operation block 1108 of method 1100 (FIG. 11); block 1210 of method 1200 (FIG. 12); block 1308 of method 1300 (FIG. 13); block 1410 of method 1400 (FIG. 14); block 1504 of method 1500 (FIG. 15); and block 1604 of method 1600 (FIG. 16). In an exemplary embodiment, the means 1904 for measuring voltage (amplitude and phase) and current (amplitude and phase) of the signal having a frequency related to a power transmit frequency may comprise the structure shown in at least one of FIG. 7 and FIG. 9. The apparatus 1900 further comprises means 1906 for detecting a change in harmonics at the transmit antenna. In certain embodiments, the means 1906 for detecting a change in harmonics at the transmit antenna can be configured to perform one or more of the function described in operation blocks 1112 or 1114 of method 1100 (FIG. 11); block 1212 of method 1200 (FIG. 12); blocks 1312 or 1314 of method 1300 (FIG. 13); block 1412 of method 1400 (FIG. 14); blocks 1508 and 1510 of method 1500 (FIG. 15); and block 1608 of method 1600 (FIG. 16). In an exemplary embodiment, the means 1906 for detecting a change at the transmit antenna may comprise measuring the change in one or more of voltage, current, power or impedance harmonics at the antenna 806 by the controller 780.

The apparatus 1900 further comprises means 1908 for using the detected change in harmonics at the transmit antenna. In certain embodiments, the means 1908 for using the detected change at the transmit antenna can be configured to perform one or more of the function described in operation block 1116 of method 1100 (FIG. 11); block 1214 of method 1200 (FIG. 12); block 1316 of method 1300 (FIG. 13); block 1414 of method 1400 (FIG. 14); block 1512 of method 1500 (FIG. 15); and block 1612 of method 1600 (FIG. 16). In an exemplary embodiment, the means 1908 for using the detected change at the transmit antenna may comprise using the controller 780 or the controller 980 to characterize the object.

Figure 20:
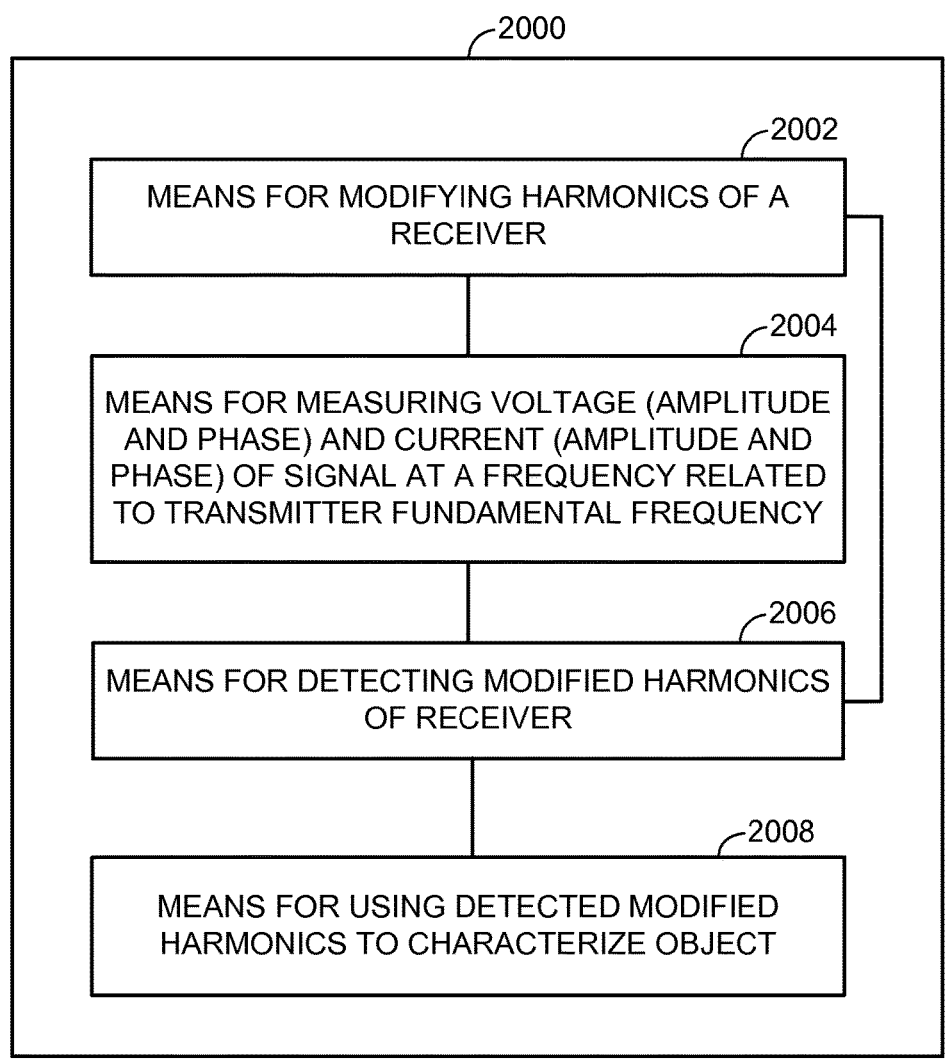
FIG. 20 is a functional block diagram of an apparatus for detecting and characterizing an object for wireless charging in which communication is established between a receiver and a transmitter.

FIG. 20 is a functional block diagram of an apparatus 2000 for detecting and characterizing an object for wireless charging in which communication is established between a receiver and a transmitter.

The apparatus 2000 comprises means 2002 for modifying harmonics of a receiver. In certain embodiments, the means 2002 for modifying harmonics of a receiver can be configured to perform one or more of the function described in operation block 1706 of method 1700 (FIG. 17); and block 1806 of method 1800 (FIG. 18). In an exemplary embodiment, the means 2002 for modifying harmonics of a receiver may use harmonics modified by a switching impedance network in the receiver or harmonics modified by shifting switching angles of the rectifier or switching converters in the receiver. The apparatus 2000 further comprises means 2004 for measuring voltage (amplitude and phase), current (amplitude and phase), power or impedance of the signal having a frequency related to a power transmit frequency. In certain embodiments, the means 2004 for measuring voltage (amplitude and phase), current (amplitude and phase), power or impedance of the signal having a frequency related to a power transmit frequency can be configured to perform one or more of the function described in operation block 1710 of method 1700 (FIG. 17); and block 1812 of method 1800 (FIG. 18). In an exemplary embodiment, the means 2004 for measuring voltage (amplitude and phase), current (amplitude and phase), power and impedance of the signal having a frequency related to a power transmit frequency may comprise the structure shown in at least one of FIG. 7 and FIG. 9. The apparatus 2000 further comprises means 2006 for detecting the modified harmonics of the receiver. In certain embodiments, the means 2006 for detecting the modified harmonics of the receiver can be configured to perform one or more of the function described in operation block 1714 of method 1700 (FIG. 17); and block 1814 of method 1800 (FIG. 18). In an exemplary embodiment, the means 2006 for detecting the modified harmonics of the receiver may comprise the structure shown in at least one of FIG. 7 and FIG. 9. The apparatus 2000 further comprises means 2008 for using the detected harmonics to characterize the object. In certain embodiments, the means 2008 for using the detected harmonics to characterize the object can be configured to perform one or more of the function described in operation block 1716 of method 1700 (FIG. 17); and block 1816 of method 1800 (FIG. 18). In an exemplary embodiment, the means 2008 for using the detected harmonics to characterize the object may comprise the structure shown in at least one of FIG. 7 and FIG. 9.

Figure 21:
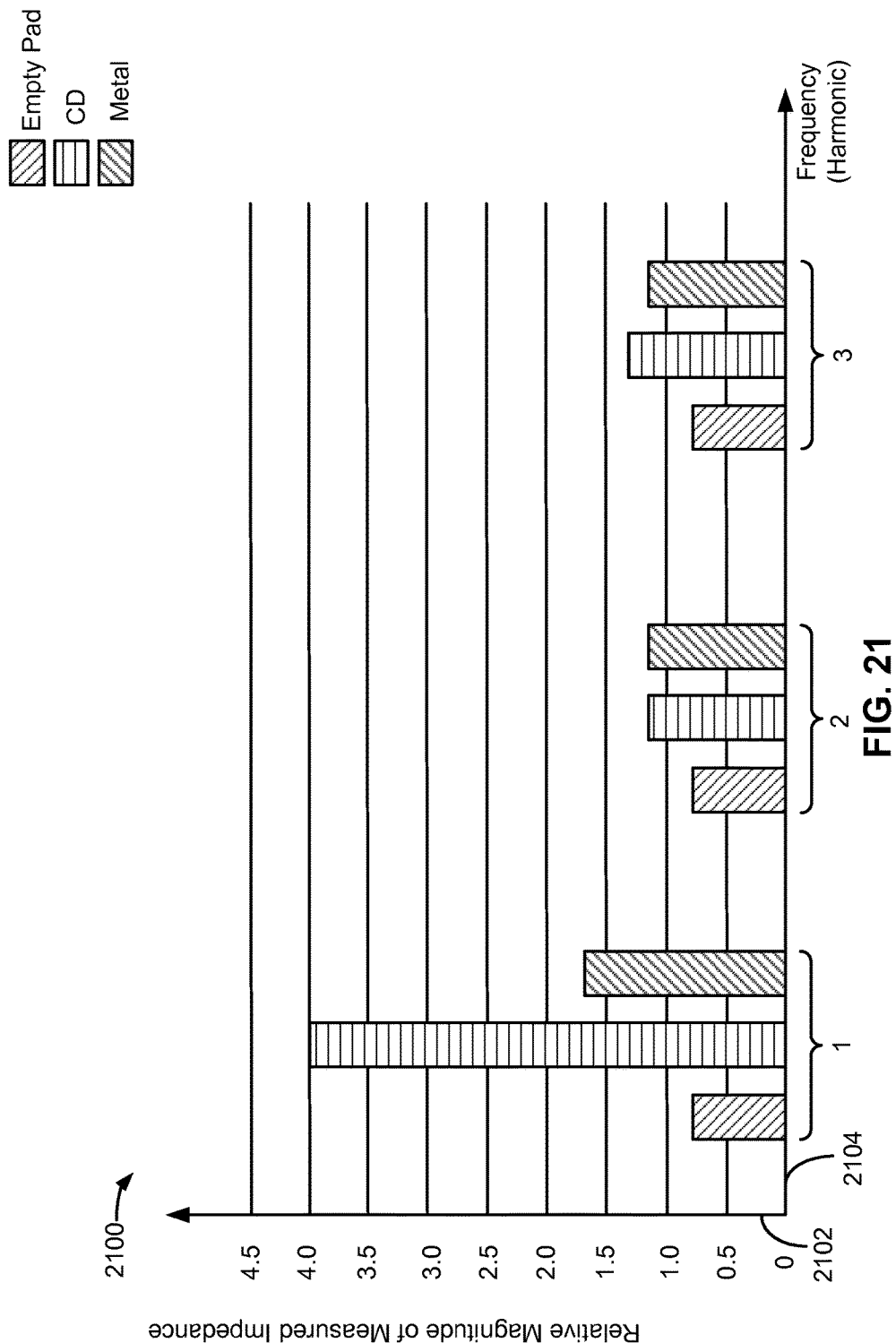
FIG. 21 is a graphical illustration showing an example of an impedance change at the transmit antenna caused by an object located in proximity to the transmit antenna.

FIG. 21 is a graphical illustration showing an example of an impedance change at the transmit antenna caused by an object located in proximity to the transmit antenna. The vertical axis 2102 of the graph 2100 represents the relative magnitude of the impedance measured at the antenna 806 of the transmitter. This example uses relative magnitude of impedance and is therefore dimensionless. However other metrics, such as for example only, voltage, current, power, etc., can be used to characterize objects. The horizontal axis 2104 represents frequency, particularly showing harmonics of the fundamental power transmit frequency. In the example shown in FIG. 21, the first three harmonics of the fundamental power transmit frequency are shown relatively, but other numbers of harmonics or other frequencies can be used.

In order to detect and characterize an object placed in proximity to a transmit antenna, such as the antenna 806 of FIG. 8, it is possible to detect an impedance change at the antenna 806. For example, locating an object in proximity to an antenna 806, such as when an object is placed on a wireless charging surface, can result in a measurable impedance change being imparted to the antenna 806. In an exemplary embodiment, the magnitude of this impedance change is proportional to the square of the frequency and inversely proportional to the impedance of the object. Therefore, in an exemplary embodiment, impedance change can more easily be detected and measured at harmonic frequencies than at a fundamental transmit frequency. In an exemplary embodiment, an object can be detected and characterized by measuring the impedance change (or voltage and/or current changes) at various harmonic frequencies.

The impedance of a foreign object, such as metal, a CD) etc., is a function the measurement frequency and the object's characteristics. For example a CD has a unique structure, a thin sheet of aluminum, which can be detected. The impedance vs. frequency (measured at the various harmonics) can be used as a metric to detect and characterize an object.

The impedance of a tuned circuit has a relatively low impedance at the fundamental power transfer frequency and a relatively high impedance at higher harmonics (also a function of the front-end filter implementation, such as the matching circuit 730 of FIG. 7). Therefore, in an exemplary embodiment, a tuned circuit has a unique impedance vs. frequency curve. The relatively high impedance at higher harmonic frequencies leads to a low measured impedance at the transmit antenna 806.

For example, as shown in FIG. 21, at a first harmonic frequency, an empty wireless charging surface shows a relative measured impedance of approximately 0.7, a CD placed on a wireless charging surface shows a relative measured impedance of approximately 4.0, and a metal object placed on a wireless charging surface shows a relative measured impedance of approximately 1.7. The different relative magnitudes of the measured impedance at the first harmonic of the fundamental transmit frequency can be used to discriminate between and among an empty wireless charging surface, a wireless charging surface on which a CD is placed, and a wireless charging surface on which a metal object is placed.

Further, as shown in FIG. 21, at a second harmonic frequency, an empty wireless charging surface shows a relative measured impedance of approximately 0.7, a CD placed on a wireless charging surface shows a relative measured impedance of approximately 1.1 and a metal object placed on a wireless charging surface shows a relative measured impedance of approximately 1.1. The different relative magnitudes of the measured impedance at the second harmonic of the fundamental transmit frequency can be used to discriminate between and among an empty wireless charging surface, a wireless charging surface on which a CD is placed, or a wireless charging surface on which a metal object is placed. However, at the exemplary second harmonic frequency, it is difficult to distinguish between a wireless charging surface on which a CD is placed and a wireless charging surface on which a metal object is placed.

Further, as shown in FIG. 21, at a third harmonic frequency, an empty wireless charging surface shows a relative measured impedance of approximately 0.7, a CD placed on a wireless charging surface shows a relative measured impedance of approximately 1.2, and a metal object placed on a wireless charging surface shows a relative measured impedance of approximately 1.1. The different relative magnitudes of the measured impedance at the third harmonic of the fundamental transmit frequency can be used to discriminate between and among an empty wireless charging surface, a wireless charging surface on which a CD is placed, and a wireless charging surface on which a metal object is placed.

The values for relative magnitude of the impedance (or voltage and current) measured at the antenna 806 of the power transmitting unit shown in FIG. 21 are rescaled to show the trend. In this manner, by comparing magnitudes of certain parameters, such as impedance, voltage harmonics, current harmonics, etc., to expected values for different types of objects it is possible to determine the nature of the object, such as, for example, whether the object is a CD or other similar object as compared to a wireless power receiver based on the expected magnitudes at different frequencies. The expected magnitudes may form a signature value at a particular frequency, the signature value being 'unique' to that object.

Figure 22:
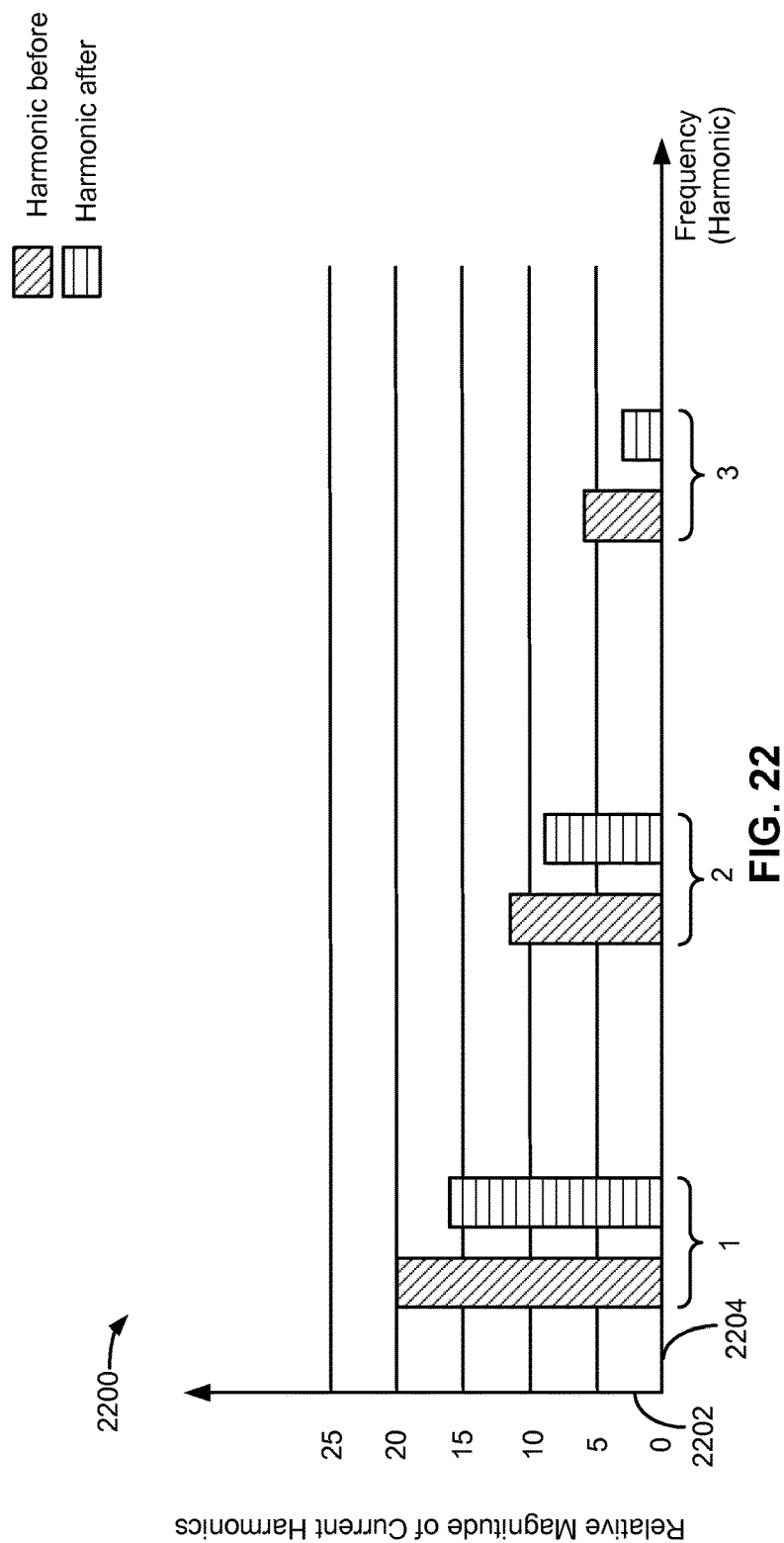
FIG. 22 is a graphical illustration showing an example of the change in harmonics related to a change of the resonant frequency at the transmit antenna caused by an object located in proximity to the transmit antenna.

FIG. 22 is a graphical illustration showing an example of the change in harmonics related to a change of the resonant frequency at the transmit antenna caused by an object located in proximity to the transmit antenna. The vertical axis 2202 of the graph 2200 represents the relative magnitude of the current harmonics measured at the antenna 806 of the transmitter 404. However, voltage harmonics can also be measured. The measurement of the harmonics can be obtained by measuring one or more of the voltage, current, power and impedance using the power and impedance measurement circuit 430 (exemplary implementations of which are shown in FIG. 7 or the circuit of FIG. 9). The horizontal axis 2204 represents frequency, particularly showing harmonics of the fundamental power transmit frequency. In the example shown in FIG. 22, the first three harmonics of the fundamental power transmit frequency are shown relatively, but other numbers of harmonics or other frequencies can be used.

In order to detect and characterize an object placed in proximity to a wireless charging antenna, such as the antenna 806 of FIG. 8, it is possible to detect a change in harmonics caused by a change in the resonant frequency at the antenna 806. A foreign object placed in proximity to the antenna 806 shifts the resonant frequency of the antenna 806. This shift in the resonant frequency of the antenna 806 results in a change in the relative magnitude of the measured harmonics.

For example, locating an object in proximity to a wireless charging antenna, such as when an object is placed on a wireless charging surface, can result in a measurable change in harmonic content as measured at the wireless charging antenna. Different objects affect the measured harmonics to different extents and this difference can be used to characterize the object.

For example, as shown in FIG. 22, at a first harmonic frequency, the relative magnitude of the measured harmonics before a change in the resonant frequency of the antenna 806 is illustratively shown as approximately 20 and the relative magnitude of the measured harmonics after a change in the resonant frequency of the antenna 806 is illustratively shown as approximately 16.

Further, as shown in FIG. 22, at a second harmonic frequency, the relative magnitude of the measured harmonics before a change in the resonant frequency of the antenna 806 is illustratively shown as approximately 12 and the relative magnitude of the measured harmonics after a change in the resonant frequency of the antenna 806 is illustratively shown as approximately 9.

Further, as shown in FIG. 22, at a third harmonic frequency, the relative magnitude of the measured harmonics before a change in the resonant frequency of the antenna 806 is illustratively shown as approximately 6 and the relative magnitude of the measured harmonics after a change in the resonant frequency of the antenna 806 is illustratively shown as approximately 3. In this manner, by comparing magnitudes of certain parameters, such as impedance, voltage harmonics, current harmonics, etc., at different harmonic frequencies, or other frequencies, it is possible to determine the nature of the object, such as, for example, whether the object is a CD or other similar object as compared to a wireless power receiver based on the expected magnitudes at different frequencies. The expected magnitudes may form a signature value at a particular frequency, the signature value being 'unique' to that object.

Figure 23:
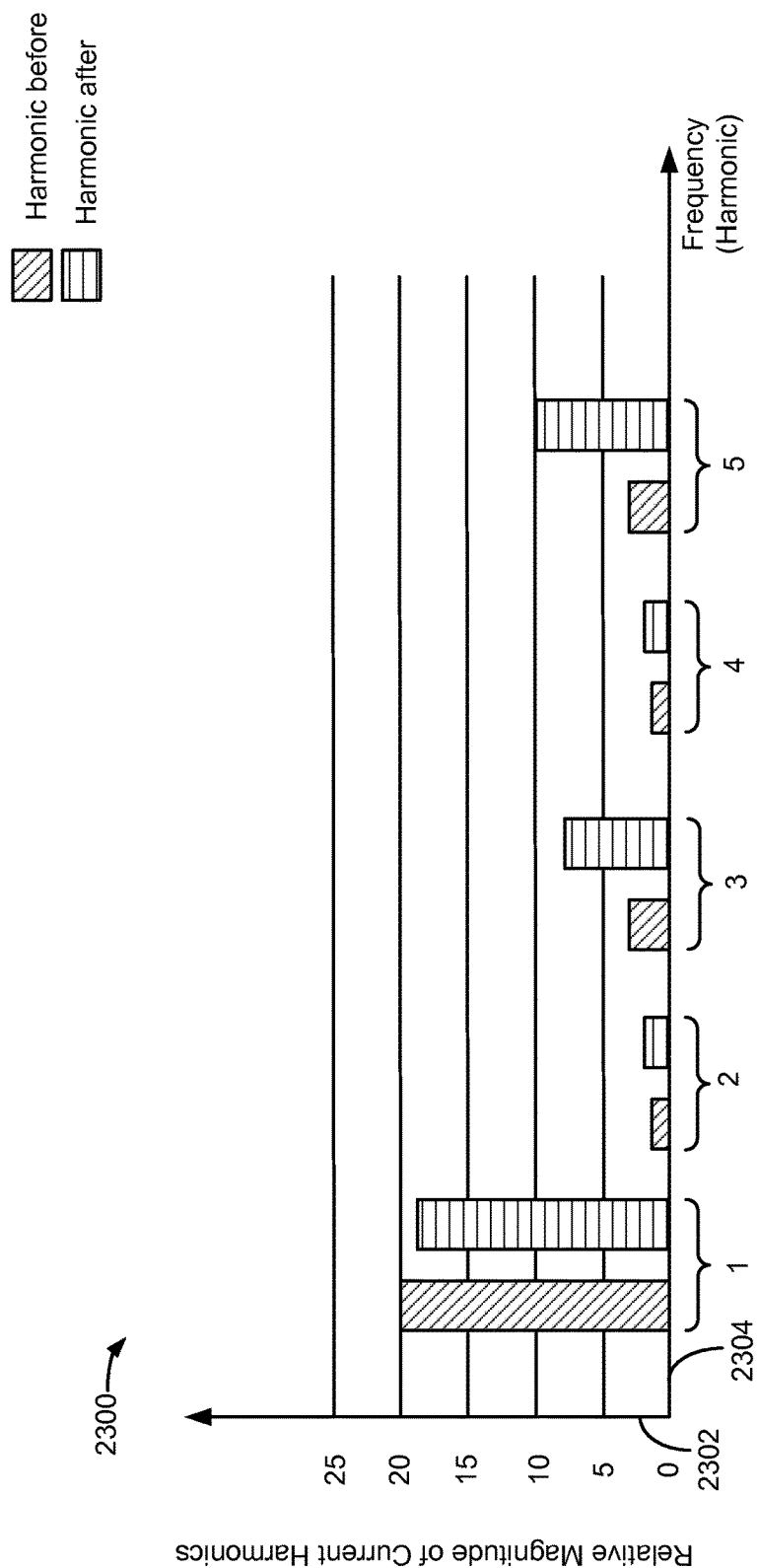
FIG. 23 is a graphical illustration showing an example of the change in harmonics measured at the transmit antenna caused by harmonics generated by a power receiver located in proximity to the transmit antenna.

FIG. 23 is a graphical illustration showing an example of the change in harmonics measured at the transmit antenna caused by harmonics generated by a power receiver located in proximity to the transmit antenna. The vertical axis 2302 of the graph 2300 represents the relative magnitude of the current harmonics measured at the antenna 806 of the transmitter 404. However, voltage harmonics can also be measured. The measurement of the harmonics can be obtained by measuring one or more of the voltage, current, power and impedance using the power and impedance measurement circuit 430 (exemplary implementations of which are shown in FIG. 7 or the circuit of FIG. 9). The horizontal axis 2304 represents frequency, particularly showing harmonics of the fundamental power transmit frequency. In the example shown in FIG. 23, the first five harmonics of the fundamental power transmit frequency are shown relatively, but other numbers of harmonics or frequencies other than harmonics of the fundamental power transmit frequency can be used.

As an example of measuring a change in harmonics at the transmit antenna caused by harmonics generated by a receiver in an object located in proximity to the power transmitting unit antenna, a rectifier in the power receiving unit (FIG. 5) can be implemented using diodes or other switching devices (e.g., a synchronous rectification circuit). The non-linear operation of such a switching device results in voltage and current harmonics which can be emitted out through the antenna of the receiver 508. A portion of these emitted signals couple with the antenna 806 in the transmitter 404 by vector summing and can be measured using the methodologies mentioned above in FIG. 7 or FIG. 9, or other equivalent circuitry.

For example, a typical bridge rectifier implementation may produce high odd-order harmonic components, which can be measured at the antenna 806 in the transmitter 404. For example, as shown in FIG. 23, at a first harmonic frequency, the relative magnitude of the harmonics measured at the antenna 806 before a change in harmonics caused by a power receiver located in an object located in proximity to the antenna 806 is illustratively shown as approximately 20 and the relative magnitude of the harmonics measured at the antenna 806 after a change in harmonics at the antenna 806 caused by a power receiver located in an object located in proximity to the antenna 806 is illustratively shown as approximately 18.

Further, as shown in FIG. 23, at a second harmonic frequency, the relative magnitude of the harmonics measured at the antenna 806 before a change in harmonics caused by a power receiver located in an object located in proximity to the antenna 806 is illustratively shown as approximately 2 and the relative magnitude of the harmonics measured at the antenna 806 after a change in harmonics at the antenna 806 caused by a power receiver located in an object located in proximity to the antenna 806 is illustratively shown as approximately 3.

Further, as shown in FIG. 23, at a third harmonic frequency, the relative magnitude of the harmonics measured at the antenna 806 before a change in harmonics caused by a power receiver located in an object located in proximity to the antenna 806 is illustratively shown as approximately 4 and the relative magnitude of the harmonics measured at the antenna 806 after a change in harmonics at the antenna 806 caused by a power receiver located in an object located in proximity to the antenna 806 is illustratively shown as approximately 8.

Further, as shown in FIG. 23, at a fourth harmonic frequency, the relative magnitude of the harmonics measured at the antenna 806 before a change in harmonics caused by a power receiver located in an object located in proximity to the antenna 806 is illustratively shown as approximately 2 and the relative magnitude of the harmonics measured at the antenna 806 after a change in harmonics at the antenna 806 caused by a power receiver located in an object located in proximity to the antenna 806 is illustratively shown as approximately 3.

Further, as shown in FIG. 23, at a fifth harmonic frequency, the relative magnitude of the harmonics measured at the antenna 806 before a change in harmonics caused by a power receiver located in an object located in proximity to the antenna 806 is illustratively shown as approximately 4 and the relative magnitude of the harmonics measured at the antenna 806 after a change in harmonics at the antenna 806 caused by a power receiver located in an object located in proximity to the antenna 806 is illustratively shown as approximately 10.

It is also possible for the measured harmonic to be lower due to the vector sum combination of the harmonics radiated by the receiver antenna and coupled to the antenna 806 in the transmitter 404. For example, it is possible that a system may exhibit a different trend to that described in the example because it adds vectorially to the harmonics generated elsewhere (for example, in the receiver 508). Further, a passive object will not cause a substantial relative change in harmonics. The voltage harmonics may also provide measurable data correlating to the measured current harmonics.

The relative magnitude of the harmonics are a function of the rectifier topology. For example a single ended doubler rectifier will have a different harmonic profile than a bridge rectifier. Further, a synchronous rectifier can have a different harmonic signature. In this manner, by comparing magnitudes of certain parameters, such as impedance, voltage harmonics, current harmonics, etc., at different harmonic frequencies, or other frequencies, it is possible to determine the nature of the object, such as, for example, whether the object is a power receiver or another object based on the expected magnitudes at different frequencies. The expected magnitudes may form a signature value at a particular frequency, the signature value being 'unique' to that object.

Figure 24:
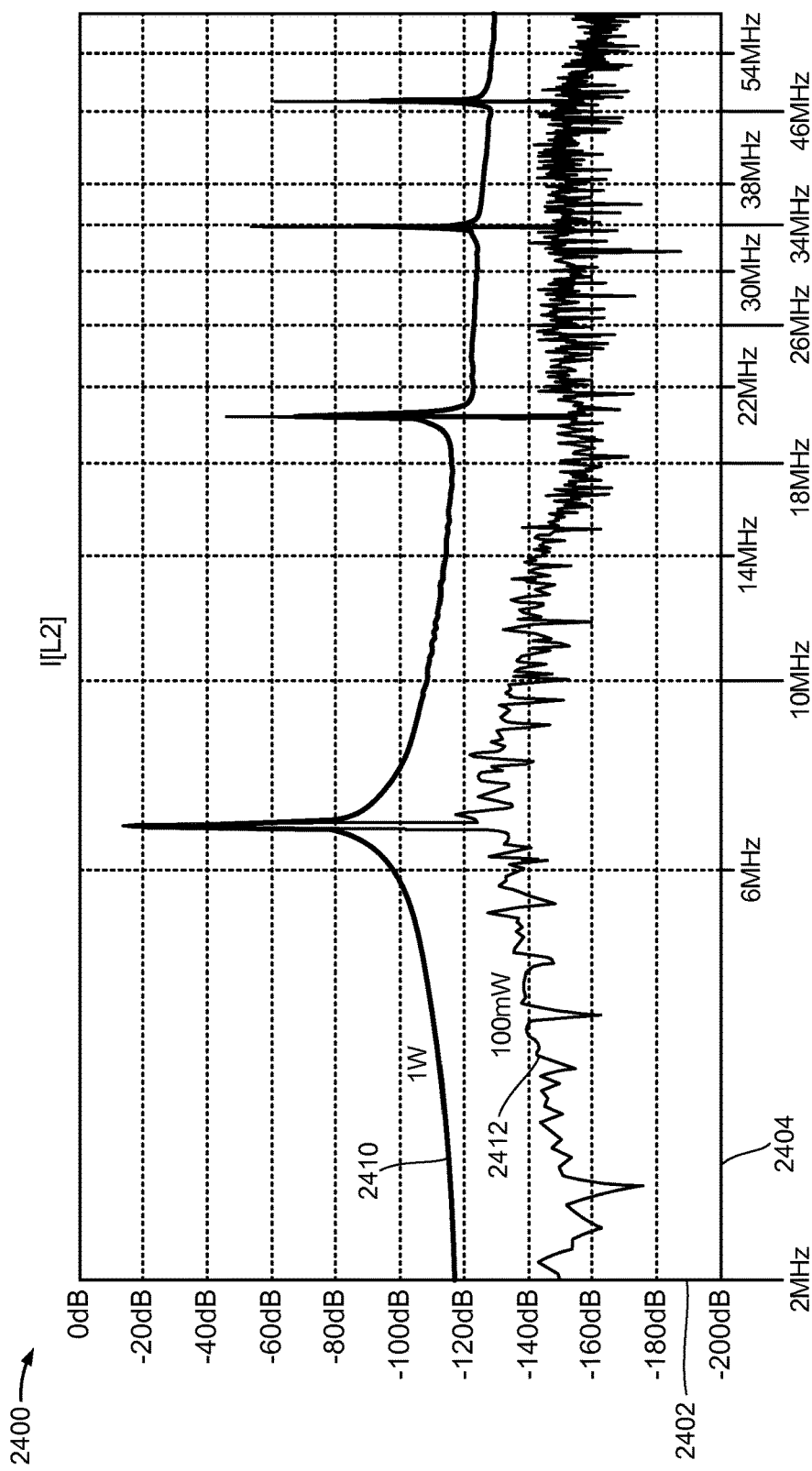
FIG. 24 is a graphical illustration showing current harmonics at a power receiver antenna.

FIG. 24 is a graphical illustration showing current harmonics at a power receiver antenna. The vertical axis 2402 of the graph 2400 represents the relative magnitude of the radiated harmonics, and the horizontal axis 2404 represents frequency.

In an exemplary embodiment, the magnitude of the harmonics generated by the power receiver are a function of the conduction angle of the switching elements (which constitute the rectifier) in the power receiver and are therefore load dependent. For example a receiver might create a certain loading pattern which can be detected at the transmitter. The graph 2400 shows an example of how the current harmonics (measured at the receive antenna coil) change with power level (100 mW vs. 1 W). The trace 2410 shows the radiated harmonics at 1 W and the trace 2412 shows the radiated harmonics at 100 mW.

The implementation of the DC/DC converter 522 (FIG. 5) following the rectifier (the RF-DC converter 520, FIG. 5) can influence the conduction angle of the rectifier switches and can generate harmonics that can be detected at the antenna 806 of the transmitter 404. Alternative wireless power receiver implementations can incorporate multi-mode DC/DC converters which may cause changes in current/voltage harmonics and reflected impedance ($Z_O$) while switching modes. These changes in current/voltage harmonics and reflected impedance ($Z_O$) generate a unique signature which can be detected and used to characterize the object.

Figure 25:
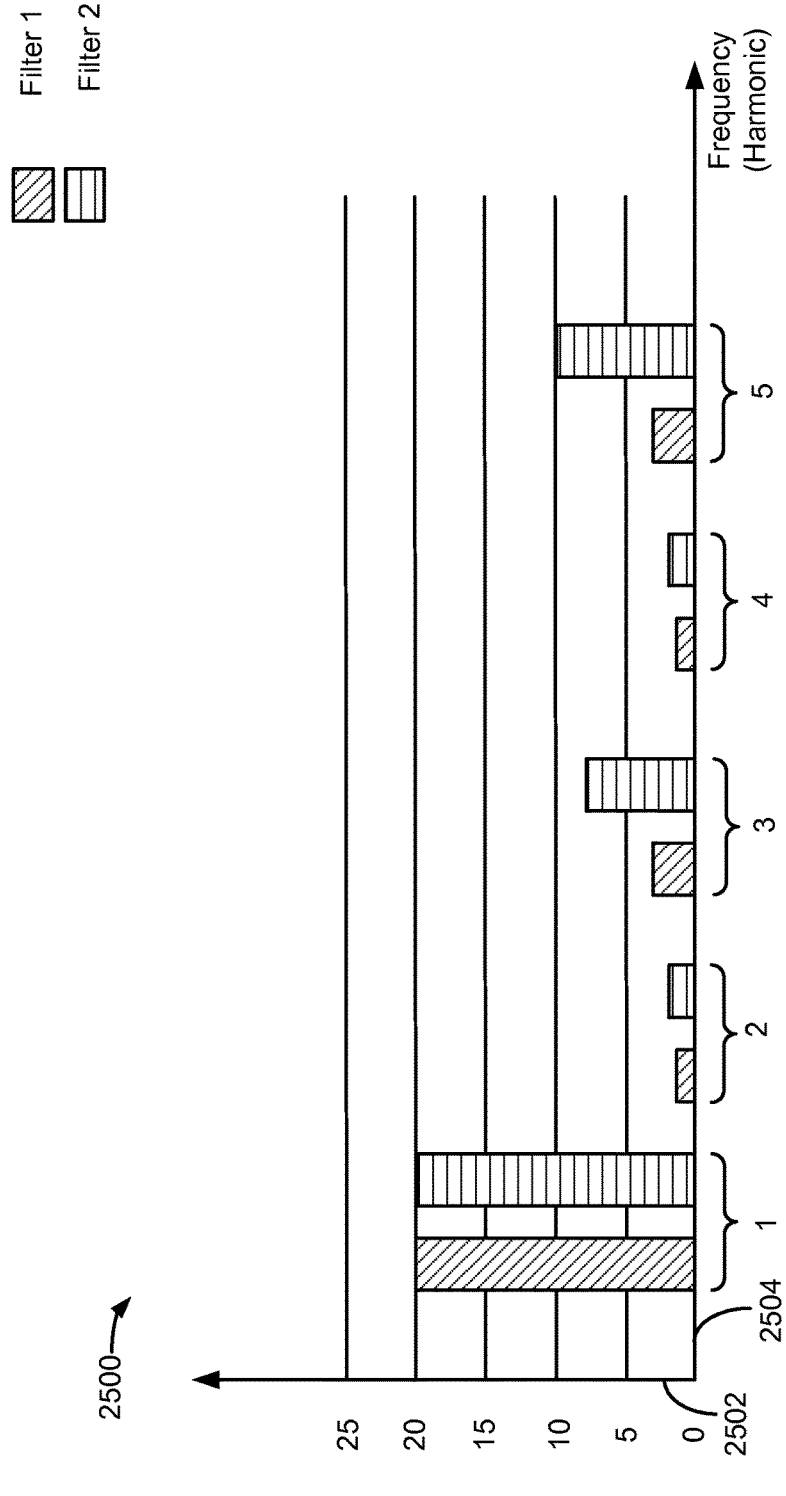
FIG. 25 is a graphical illustration showing an example of the change in harmonics measured at the transmit antenna caused by harmonics generated by a power receiver located in proximity to the transmit antenna.

FIG. 25 is a graphical illustration showing an example of the change in harmonics measured at the transmit antenna caused by harmonics generated by a power receiver located in proximity to the transmit antenna. In this example, the change in harmonics is caused by a filter (such as an EMI (electro-magnetic interference) filter) located in a power receiver, such as the receiver 508. A typical filter may be a band pass filter centered at, for example, 6.78 MHz (the fundamental power transfer frequency in an exemplary embodiment) to filter out the harmonics generated by the receive circuitry 510 and prevent them from coupling into the antenna in the receiver 508. The nature of the filter implementation will affect the relative magnitude of the current (or voltage) harmonics measured at the antenna 806.

The vertical axis 2502 of the graph 2500 represents the relative magnitude of the current harmonics measured at the antenna 806 of the transmitter 404. However, voltage harmonics can also be measured. The measurement of the harmonics can be obtained by measuring the voltage and the current (FIG. 7), or by measuring the power or impedance (FIG. 9). The horizontal axis 2504 represents frequency, particularly showing harmonics of the fundamental power transmit frequency. In the example shown in FIG. 25, the first five harmonics of the fundamental power transmit frequency are shown relatively, but other numbers of harmonics or frequencies can be used.

For example, as shown in FIG. 25, at a first harmonic frequency, the relative magnitude of the harmonics measured at the antenna 806 as a result of a first filter implementation in the receiver 508 is illustratively shown as approximately 20 and the relative magnitude of the harmonics measured at the antenna 806 as a result of a second filter implementation in the receiver 508 is illustratively shown as approximately 20.

Further, as shown in FIG. 25, at a second harmonic frequency, the relative magnitude of the harmonics measured at the antenna 806 as a result of a first filter implementation in the receiver 508 is illustratively shown as approximately 2 and the relative magnitude of the harmonics measured at the antenna 806 as a result of a second filter implementation in the receiver 508 is illustratively shown as approximately 3.

Further, as shown in FIG. 25, at a third harmonic frequency, the relative magnitude of the harmonics measured at the antenna 806 as a result of a first filter implementation in the receiver 508 is illustratively shown as approximately 4 and the relative magnitude of the harmonics measured at the antenna 806 as a result of a second filter implementation in the receiver 508 is illustratively shown as approximately 8.

Further, as shown in FIG. 25, at a fourth harmonic frequency, the relative magnitude of the harmonics measured at the antenna 806 as a result of a first filter implementation in the receiver 508 is illustratively shown as approximately 2 and the relative magnitude of the harmonics measured at the antenna 806 as a result of a second filter implementation in the receiver 508 is illustratively shown as approximately 3.

Further, as shown in FIG. 25, at a fifth harmonic frequency, the relative magnitude of the harmonics measured at the antenna 806 as a result of a first filter implementation in the receiver 508 is illustratively shown as approximately 4 and the relative magnitude of the harmonics measured at the antenna 806 as a result of a second filter implementation in the receiver 508 is illustratively shown as approximately 10. In this manner, by comparing magnitudes of certain parameters, such as impedance, voltage harmonics, current harmonics, etc., at different harmonic frequencies, or other frequencies, it is possible to determine the nature of the object, such as, for example, whether the object is a power receiver or another object based on the expected magnitudes at different frequencies. The expected magnitudes may form a signature value at a particular frequency, the signature value being 'unique' to that object.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium.

For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A system for detecting and characterizing an object proximate to a wireless power transmitting unit, comprising:
   a transmit circuit having a transmit antenna, the transmit circuit configured to transmit at least one signal at a selectable harmonic frequency of a fundamental power transmit frequency;
   the transmit circuit configured to measure a response of the transmit antenna at the selectable harmonic frequency; and
   a controller circuit configured to characterize the object based on the response of the transmit antenna.

2. The system of claim 1, wherein the transmit circuit is configured to measure at least one of voltage magnitude and phase or current magnitude and phase at the transmit antenna.

3. The system of claim 1, wherein the transmit circuit is configured to measure at least one of power or impedance at the transmit antenna.

4. The system of claim 1, wherein the transmit circuit is configured to measure an impedance change at the transmit antenna.

5. The system of claim 1, wherein the transmit antenna is configured to operate at a resonant frequency and the transmit circuit is configured to measure a change in harmonics resulting from a change in the resonant frequency of the transmit antenna.

6. The system of claim 1, wherein the transmit circuit is configured to measure a change in harmonics at the transmit antenna, the change in harmonics caused by a power receiving unit.

7. The system of claim 6, wherein the change in harmonics caused by the power receiving unit comprises harmonics generated by active devices in the power receiving unit.

8. The system of claim 1, wherein the transmit circuit comprises a resonant circuit comprising the transmit antenna.

9. The system of claim 1, wherein the controller circuit is configured to compare the measured response of the transmit antenna against a signature value to characterize the object.

10. A method for detecting and characterizing an object proximate to a wireless power transmitting unit, comprising:
    generating at least one signal at a selectable harmonic frequency of a fundamental power transmit frequency;
    transmitting the at least one signal at the selectable harmonic frequency of the fundamental power transmit frequency using a transmit antenna in a transmit circuit;
    measuring a response of the transmit antenna at the transmit circuit at the selectable harmonic frequency; and
    using the measured response of the transmit antenna to characterize the object.

11. The method of claim 10, wherein measuring a response of the transmit antenna at the transmit circuit comprises measuring at least one of voltage magnitude and phase or current magnitude and phase.

12. The method of claim 10, wherein measuring a response of the transmit antenna at the transmit circuit comprises measuring at least one of power or impedance.

13. The method of claim 10, wherein using the measured response of the transmit antenna to characterize the object comprises measuring an impedance change at the transmit antenna.

14. The method of claim 10, wherein using the measured response of the transmit antenna to characterize the object comprises measuring a change in harmonics resulting from a change in a resonant frequency of the transmit antenna.

15. The method of claim 10, wherein using the measured response of the transmit antenna to characterize the object comprises measuring a change in harmonics at the transmit antenna, the change in harmonics caused by a power receiving unit.

16. The method of claim 15, wherein the change in harmonics caused by the power receiving unit comprises harmonics generated by active devices in the power receiving unit.

17. The method of claim 10, wherein the measured response of the transmit antenna is compared against a signature value to characterize the object.

18. The method of claim 10, wherein the transmit circuit comprises a resonant circuit comprising the transmit antenna.

19. A device for detecting and characterizing an object proximate to a wireless power transmitting unit, comprising:
    means for generating at least one signal at a selectable harmonic frequency of a fundamental power transmit frequency;
    means for transmitting the at least one signal at the selectable harmonic frequency of the fundamental power transmit frequency;
    means for measuring a response of the transmitting means at the selectable harmonic frequency; and
    means for characterizing the object based on the measured response of the transmitting means.

20. The device of claim 19, further comprising means for measuring an impedance change at the transmitting means.

21. An apparatus for detecting an object positioned in a magnetic field generated by a wireless power transmitting unit, the apparatus comprising:
    a power transmit circuit comprising a transmit antenna configured to generate the magnetic field in response to being driven by a signal at a fundamental power transmit frequency, the signal having one or more signal components at a frequency related to the fundamental power transmit frequency;

a measurement circuit configured to measure one or more characteristics indicative of an impedance of the transmit antenna at a selectable harmonic frequency of the fundamental power transmit frequency in response to the object positioned in the magnetic field; and a controller circuit configured to determine one or more characteristics indicative of a type of the object based on the one or more characteristics indicative of the impedance of the transmit antenna at the selectable harmonic frequency of the fundamental power transmit frequency and based on one or more expected characteristic impedance responses for different types of objects at the selectable harmonic frequency of the fundamental power transmit frequency.

22. The apparatus of claim 21, wherein the one or more signal components at the frequency correspond to one or more selectable harmonics of the fundamental power transmit frequency.

23. The apparatus of claim 21, wherein the one or more expected characteristic impedance responses for different types of objects correspond to a particular signature impedance response substantially unique to each of the different types of objects.

24. The apparatus of claim 21, wherein the controller circuit is configured to determine that the one or more characteristics indicative of the type of the object indicate the object is a compliant wireless power receiver configured for coupling power via the magnetic field to charge a load based on determining the one or more characteristics indicative of the impedance of the transmit antenna at the frequency related to the fundamental power transmit frequency correspond to an expected characteristic impedance response of the one or more expected characteristic impedance responses that are caused by harmonics of one or more active components of receiver circuitry of the compliant wireless power receiver.

25. The apparatus of claim 21, wherein the controller circuit is configured to determine that the one or more characteristics indicative of the type of the object indicate the object is at least one of a non-compliant receiver or foreign object based on determining the one or more characteristics indicative of the impedance of the transmit antenna at the frequency related to the fundamental power transmit frequency correspond to an expected characteristic impedance response of the one or more expected characteristic impedance responses that are substantially unique to the non-compliant receiver or foreign object.

* * * * *